US012043510B2

(12) United States Patent
Nakajima

(10) Patent No.: US 12,043,510 B2
(45) Date of Patent: Jul. 23, 2024

(54) BELT FEEDING DEVICE AND IMAGE FORMING APPARATUS

(71) Applicant: CANON KABUSHIKI KAISHA, Tokyo (JP)

(72) Inventor: Takao Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/324,985

(22) Filed: May 28, 2023

(65) Prior Publication Data

US 2023/0294939 A1 Sep. 21, 2023

Related U.S. Application Data

(62) Division of application No. 17/468,416, filed on Sep. 7, 2021, now Pat. No. 11,702,306.

(30) Foreign Application Priority Data

Sep. 16, 2020 (JP) ................................ 2020-155906

(51) Int. Cl.
*B65H 5/02* (2006.01)
*G03G 15/16* (2006.01)

(52) U.S. Cl.
CPC ............ *B65H 5/026* (2013.01); *B65H 5/021* (2013.01); *G03G 15/1615* (2013.01); (Continued)

(58) Field of Classification Search
CPC ....... G03G 15/1615; G03G 2221/1642; B65H 2404/255; B65H 2403/25; B65H 5/026; B56H 2301/531
See application file for complete search history.

(56) References Cited

U.S. PATENT DOCUMENTS 8,146,734 B2 * 4/2012 Shoji .................. G03G 15/0131 198/813
8,689,967 B2 4/2014 Kitamura ...................... 198/806
(Continued)

FOREIGN PATENT DOCUMENTS

JP 2004-109267 4/2004
JP 2006-317594 11/2006
(Continued)

OTHER PUBLICATIONS

Office Action dated Apr. 30, 2024 in counterpart Japanese Application No. 2020-155906, together with English translation thereof.

*Primary Examiner* — Jeremy R Severson
(74) *Attorney, Agent, or Firm* — Venable LLP

(57) ABSTRACT

A belt feeding device includes an endless belt, stretching rollers including a tension roller, a bearing member supporting the tension roller, a beating support member supporting the bearing member, an urging member urging the tension roller, a supporting member supporting the bearing supporting member, and a locking member. The locking member is movable between a first position where an engagement between the locking member and one of the bearing support member and the bearing member is released and the bearing member is permitted to move so as to apply the tension to the belt, and a second position where the locking member locks the bearing member by engaging with the bearing support member and the bearing member and the bearing member is restricted to move. The bearing member, the bearing support member, the urging member, and the locking member constitute a unit to be integrally dismountable from the supporting in the second position.

9 Claims, 20 Drawing Sheets

(52) U.S. Cl.
CPC .... *B65H 2301/531* (2013.01); *B65H 2402/60* (2013.01); *B65H 2403/25* (2013.01); *B65H 2601/321* (2013.01); *B65H 2601/324* (2013.01); *B65H 2801/06* (2013.01)

(56) References Cited

U.S. PATENT DOCUMENTS

| | | | | |
|---|---|---|---|---|
| 9,114,643 | B2 | 8/2015 | Yasumoto | B41J 11/007 |
| 9,244,382 | B2 | 1/2016 | Yamamoto et al. | G03G 15/0867 |
| 9,927,740 | B2 | 3/2018 | Yamamoto et al. | G03G 15/0886 |
| 10,322,893 | B2 | 6/2019 | Nakajima | B65H 5/021 |
| 11,702,306 | B2 * | 7/2023 | Nakajima | G03G 15/1615 271/275 |
| 2013/0192959 | A1 | 8/2013 | Kitamura | 198/806 |
| 2014/0183008 | A1 | 7/2014 | Yasumoto | 198/813 |
| 2018/0120736 | A1 | 5/2018 | Yamamoto et al. | G03G 15/0867 |

FOREIGN PATENT DOCUMENTS

| | | |
|---|---|---|
| JP | 2013-156403 | 8/2013 |
| JP | 2014-106442 | 6/2014 |
| JP | 2014-130181 | 7/2014 |
| JP | 2015-165263 | 9/2015 |
| JP | 2019-211541 | 12/2019 |

* cited by examiner (a)

(b)

(c)

(a)

(b)

(a)

(b)

BELT FEEDING DEVICE AND IMAGE FORMING APPARATUS

This application is a divisional of application Ser. No. 17/468,416 filed Sep. 7, 2021, currently pending; and claims priority under 35 U.S.C. § 119 to Japan Application JP 2020-155906 filed in Japan on Sep. 16, 2020; and the contents of all of which are incorporated herein by reference as if set forth in full.

FIELD OF THE INVENTION AND RELATED ART

The present invention relates to a belt feeding device which includes an endless belt and a plurality of stretching rollers configured to stretch the belt, and to an image forming apparatus which applies an electrophotographic method or electrostatic recording method, such as a copier, a printer, or a fax machine, provided with the belt feeding device.

Conventionally, for example, an image forming apparatus, which applies the electrophotographic method, is provided with a belt feeding device which includes an endless belt and a plurality of stretching rollers configured to stretch the belt. For example, there is an image forming device which applies an intermediary transfer method in which a toner image formed on a photosensitive member is secondary transferred to a recording material such as a recording paper after primary transferring to an intermediary transfer belt consisting of an endless belt. The belt feeding device is used, for example, as a device to feed the intermediary transfer belt. In the following, mainly, the belt feeding device which feeds the intermediary transfer belt will be described as an example.

In addition, a belt feeding device may occur "belt shift" in which a belt moves toward either side of end portion in a widthwise direction during belt feeding, due to degree of accuracy of outer diameters of stretching rollers, degree of accuracy of a relative alignment among stretching rollers, etc. A steering mechanism may be provided with a belt feeding device as a means to suppress such belt shift. A steering mechanism may be configured to tilt at least one tiltable steering roller of a plurality of stretching rollers by electronic components such as sensers and actuators. Further, an alignment mechanism which is configured to steer a steering roller without a need for such electric component is also proposed (Japanese Laid-Open Patent Application (JP-A) 2014-130181).

By the way, when an intermediary transfer belt is used continuously, it may cause image defects due to fluctuations in electrical resistance values and degradation of surface. Therefore, when an intermediary transfer belt reaches a predetermined end of lifetime, it needs to be replaced with a new one to maintain a desired image quality. However, a conventional belt feeding device has following problems.

Generally, a belt feeding device is configured to apply tension to an intermediary transfer belt by tension rollers which is urged by an urging means. Therefore, during replacing the intermediary transfer belt, it is necessary to release (block) the tension applied to the intermediary transfer belt by the tension rollers. Conventionally, components related to a supporting means and an urging means of the tension rollers are generally removed one by one and disassembled. Therefore, there is a problem that a replacement work of the intermediary transfer belt is complicated. In addition, in order to achieve easy replacement of the intermediary transfer belt, there are some configurations in which a frame of the belt feeding device can be folded. Such configuration has problems such as large in scale and increased weight.

In addition, in a case that a tension roller also serves as a tiltable steering roller in the steering mechanism, a conventional configuration for releasing tension as described above may have a problem that aligning performance may be affected due to a decrease in a positional accuracy of the component parts etc., in addition to the problems described above.

SUMMARY OF THE INVENTION

Therefore, an object of the present invention is to provide a belt feeding device whose belt is easily dismountable with a simple configuration, and an image forming apparatus provided with this belt feeding device. The object described above is achieved by the image forming apparatus of the present invention.

In summary, the present invention is a belt feeding device comprising: an endless belt, a plurality of stretching rollers, including a tension roller, configured to stretch the belt, a bearing member configured to rotatably support the tension roller in an end portion thereof with respect to a rotational axis direction of the tension roller, a beating support member configured to movably support the bearing member with respect to a direction crossing the rotational axis direction, an urging member provided between the bearing member and the bearing support member and configured to urge the tension roller to apply tension to the belt, a supporting member configured to support the bearing supporting member, and a locking member capable of locking the bearing member by engaging with the bearing support member and the bearing member, the locking member being movable between a first position where an engagement between the locking member and one of the bearing support member and the bearing member is released and the bearing member is permitted to move by the urging member so as to apply the tension to the belt, and a second position where the locking member locks the bearing member by engaging with the bearing support member and the bearing member and the bearing member is restricted to move by the urging member, wherein the bearing member, the bearing support member, the urging member, and the locking member are integrally dismountable from the supporting member in a state in which the locking member is positioned in the second position.

Further features of the present invention will become apparent from the following description of exemplary embodiments with reference to the attached drawings.

DESCRIPTION OF THE EMBODIMENTS

In the following, a belt feeding device and an image forming apparatus of the present invention will be specifically described with reference to FIGS. 1-21.

Embodiment 1

1. Overall Configuration and Operation of an Image Forming Apparatus

Figure 1:
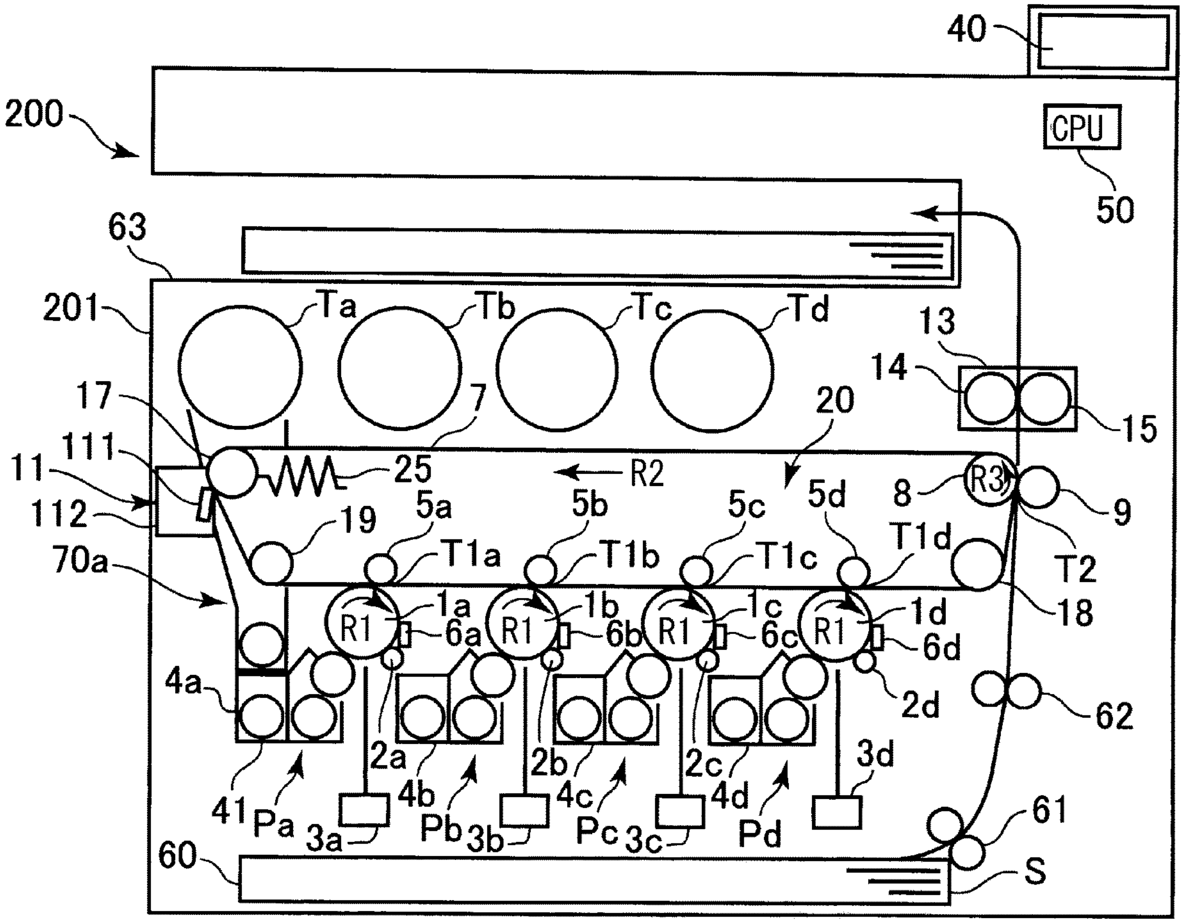
FIG. 1 is a schematic sectional view showing an image forming apparatus.

FIG. 1 is a schematic sectional view showing an image forming apparatus 200 (a section substantially perpendicular to a direction of a rotational axis of a photosensitive drum 1 as will be described below). The image forming apparatus 200 in this embodiment is a laser beam printer which applies an intermediary transfer method and a tandem method, which is capable of forming full-color images using an electrophotographic method. The image forming apparatus 200 is capable of forming images on a recording material S and outputting them based on image information read from a document or input from an external device. Incidentally, the recording material S includes recording paper such as plain paper and special paper such as coated paper, envelopes and index paper which have special shapes, plastic film for overhead projectors, and cloth, etc.

The image forming apparatus 200 includes four image forming portions Pa, Pb, Pc, Pd which form toner images of yellow, magenta, cyan, and black, respectively, as a plurality of image forming portions. Elements which are provided with the same or corresponding functions or configurations in the image forming portions Pa, Pb, Pc, and Pd for each color may be described comprehensively by omitting a, b, c, and d at ends of codes attached to the image forming portions Pa, Pb, Pc, and Pd for each color. In this embodiment, the image forming portion P consists of a photosensitive drum 1 (1*a*, 1*b*, 1*c*, 1*d*), a charging roller 2 (2*a*, 2*b*, 2*c*, 2*d*), an exposure device 3 (3*a*, 3*b*, 3*c*, 3*d*), a developing device 4 (4*a*, 4*b*, 4*c*, 4*d*), a primary transfer roller (5*a*, 5*b*, 5*c*, 5*d*), and a drum cleaning device 6 (6*a*, 6*b*, 6*c*, 6*d*) etc., as will be described below.

The photosensitive drum 1 which is a rotatable drum type (cylindrical) photosensitive member (an electrophotographic photosensitive member) as an image bearing member which bears a toner image, is rotationally driven in a direction of an arrow R1 (in a clockwise direction) in the figure. The surface of the rotating photosensitive drum 1 is uniformly charged to a predetermined electric potential of a predetermined polarity (negative polarity in this embodiment) by the charging roller 2, which is a roller type charging member as a charging means. The surface of the charged photosensitive drum 1 is scanned and exposed according to an image information by the exposure device (laser scanner) 3 as an exposure means, and an electrostatic latent image (an electrostatic image) is formed on the photosensitive drum 1. The electrostatic latent image formed on the photosensitive drum 1 is developed (visualized) by supplying toner as a developer by the developing device 4 as a developing means, and a toner image is formed on the photosensitive drum 1. In this embodiment, in the developing device 4, toner charged with the same polarity as that of the photosensitive drum 1 (negative polarity in this embodiment) is attached to an exposed portion (an image portion) on the photosensitive drum 1 where an absolute value of an electric potential is decreased by exposure after being uniformly charged (inverse development). In this embodiment, a normal charging polarity of toner, which is a charging polarity of a toner during development, is negative. In this embodiment, the charging roller 2, the exposure device 3, and the developing device 4 configure a toner image forming means which forms a toner image on the photosensitive drum 1.

Incidentally, in this embodiment, developer containers Ta, Tb, Tc, and Td, which accommodate developer for replenishing, are detachably attached to a main assembly 201 of the image forming apparatus 200. Each of the developer containers Ta, Tb, Tc, and Td accommodates developer for replenishing which contains each color toner of yellow, magenta, cyan, and black, respectively. Each developer container T replenishes the developer to the developer container 41 of the developing device 4 via a replenishing device 70 (only a replenishing device 70*a* for a yellow color is shown) at an appropriate time. In addition, in this embodiment, the developing device 4 utilizes a two-component developer which contains magnetic carrier particles (carrier) and non-magnetic toner particles (toner) as developer. However, the present invention is not limited to this, and a single component developer which consists of magnetic toner particles or non-magnetic toner particles, or a liquid developer in which toner particles are dispersed in a carrier liquid may also utilized as developer.

The intermediary transfer unit 20 is arranged to opposite four photosensitive drums 1. The intermediary transfer unit 20 includes an intermediary transfer belt 7, which is comprised of an endless belt as a rotatable intermediary transfer member, and a plurality of stretching rollers (supporting rollers) on which the intermediary transfer belt 7 is stretched. In this embodiment, the intermediary transfer unit 20 includes a secondary transfer inner roller 8, a steering roller 17, a spacing roller 19, and an upstream guide roller 18 as a plurality of stretching rollers. The intermediary transfer belt 7 is wound around a plurality of the stretching rollers 8, 17, 18, and 19, and opposes each of the photosensitive drums 1 of the image forming portion P on the outer periphery. In addition, a primary transfer roller 5, which is a roller type primary transfer member as a primary transfer means, is arranged on the inner peripheral surface side of the intermediary transfer belt 7, corresponding to each photosensitive drum 1. The primary transfer roller 5 presses the inner peripheral surface of the intermediary transfer belt 7 against the photosensitive drum 1 and form a primary transfer portion (a primary transfer nip) T1 where the photosensitive drum 1 and the intermediary transfer belt 7 are contacting each other. The intermediary transfer belt 7 rotates (moves around) in a direction of an arrow R2 (a counterclockwise direction) in the figure, as the secondary transfer inner roller 8, which has a function as a driving roller, is rotationally driven in a direction of an arrow R3 (a counterclockwise direction) in the figure by a driving motor (not shown). The secondary transfer inner roller 8 opposes a secondary transfer outer roller 9 as will be described below across the intermediary transfer belt 7, and forms a secondary transfer section T2 as will be described below together with the secondary transfer outer roller 9. The upstream guide roller 18 is arranged upstream from the secondary transfer inner roller 8 and downstream from the primary transfer roller 5 (the most downstream primary transfer roller 5*d*) with respect to the rotational direction of the intermediary transfer belt 7. The upstream guide roller 18 guides the intermediary transfer belt 7 so that it enters the secondary transfer portion T2 from a certain direction. The steering roller 17 is arranged downstream from the secondary transfer inner roller 8 and upstream from the spacing roller 19 with respect to the rotational direction of the intermediary transfer belt 7. The steering roller 17 configures a self-alignment mechanism 17U (FIG. 4) as a steering mechanism which controls a position of the intermediary transfer belt 7 with respect to a width direction of the intermediary transfer belt 7 (in a direction substantially perpendicular to a feeding direction of the intermediary transfer belt 7), as will be described in detail below. The spacing roller 19 is arranged downstream from the steering roller 17 and upstream from the primary transfer rollers 5 (the most upstream primary transfer roller 5*a*) with reference to the rotational direction of the intermediary transfer belt 7. The primary transfer rollers from 5*a* through 5*d* and the spacing roller 19 are moved by a spacing mechanism 35 (FIG. 8) as will be described in detail below and change a stretched form of the intermediary transfer belt 7. By this, it is possible to space an outer periphery surface of the intermediary transfer belt 7 from a part or all of the photosensitive drums 1*a* through 1*d*. Toner image formed on the photosensitive drum 1 is primary transferred onto the rotating intermediary transfer belt 7 by an action of the primary transfer roller 5 at the primary transfer portion T1. At a time of primary transfer, a primary transfer electric voltage (a primary transfer bias) of an opposite polarity to a normal charge polarity of toner is applied to the primary transfer roller 5. For example, during forming a full color image, each color toner image of yellow, magenta, cyan, and black formed on each photosensitive drum 1 is sequentially primary transferred onto the intermediary transfer belt 7 in a way that it is superimposed.

On the outer peripheral surface side of the intermediary transfer belt 7, a secondary transfer outer roller 9, which is a roller type secondary transfer member as a secondary transfer means, is arranged at a position opposing the secondary transfer inner roller 8. The secondary transfer outer roller 9 presses toward the secondary transfer inner roller 8, abuts with the secondary transfer inner roller 8 via the intermediary transfer belt 7, and forms a secondary transfer portion (secondary transfer nip) T2, in which the intermediary transfer belt 7 and the secondary transfer outer roller 9 are in contact. Toner image formed on the intermediary transfer belt 7 is secondary transferred to the recording material S, which is nipped and fed between the intermediary transfer belt 7 and the secondary transfer outer roller 9, by an action of the secondary transfer outer roller 9 in the secondary transfer portion T2. At a time of secondary transfer, a secondary transfer electric voltage (a secondary transfer bias) of an opposite polarity of a normal charged polarity of toner is applied to the secondary transfer outer roller 9. The recording material S is accommodated in a feeding cassette 60 as a recording material accommodating portion. The recording material S accommodated in the feeding cassette 60 is fed one sheet at a time by the feeding roller 61 etc. as a feeding means, and is fed toward a registration roller pair 62. The registration roller pair 62 corrects for skewness of the recording material S and feeds the recording material S to the secondary transfer portion T2 in accordance with a progress of an image forming operation by the image forming portion P.

The recording material S on which toner image is transferred is fed to a fixing device 13 as a fixing means. The fixing device 13 includes a heating roller 14 which is heated by a heat source such as a halogen heater, and an opposing roller 15 which presses against the heating roller 14. The fixing device 13 applies heat and pressure to the recording material S while nipping and feeding it between the heating roller 14 and the opposing roller 15. Thereby, the fixing device 13 melts and fixes toner to the recording material S, and fixes an image to the recording material S. The recording material S which has passed through the fixing device 13 is discharged (output) to a discharge tray 63 which is provided at the top of the main assembly 201. Incidentally, in case of duplex printing, the recording material S, whose first side (front side) and second side (rear side) are reversed by passing through a reversing feeding path (not shown), is fed again to the registration roller pair 62. Then, the recording material S, on which an image is formed on the rear side by passing through the secondary transfer portion T2 and the fixing device 13, is discharged to the discharge tray 63.

On the other hand, attached materials such as toner which is remaining on the photosensitive drum 1 after primary transfer (primary transfer residual toner) are removed and collected from the photosensitive drum 1 by a drum cleaning device 6 as a photosensitive cleaning means. In addition, attached materials such as toner which is remaining on the intermediary transfer belt 7 after secondary transfer (secondary transfer residual toner) are removed and collected from the intermediary transfer belt 7 by a belt cleaning device 11 as an intermediary transfer member cleaning means. In this embodiment, the belt cleaning device 11 is arranged at a position opposing the steering roller 17 via the intermediary transfer belt 7. In this embodiment, the belt cleaning device 11 includes a cleaning blade 111 as a cleaning member and a cleaning container 112. The cleaning blade 11 is pressed toward the steering roller 17 via the intermediary transfer belt 7. The belt cleaning device 11 scrapes off attached materials, such as secondary transfer residual toner, from the surface of the rotating intermediary transfer belt 7 by the cleaning blade 111 and accommodates them it in the cleaning container 112. Toner etc. accommodated in the cleaning container 112 are discharged from the cleaning container 112 by a feeding member (not shown) in the cleaning container 112 and is fed to a collection container (not shown) via a feeding path (not shown) and collected. In this embodiment, the drum cleaning device 6 also has a similar configuration with the belt cleaning device 11 described above.

Incidentally, an operation display portion 40, which serves as a user interface, is provided on the upper surface of the main assembly 201. The operation display portion 40 includes a display portion such as a liquid crystal panel which display a current setting information, etc., and an operation portion such as various buttons which allow operators such as a user or a service person, to input information. For example, operators may make setting for switching an output image between a color image and a monochrome image from the operation display portion 40. In addition, the main assembly 201 is provided with a central processing unit (CPU) 50 that provides general control of the operation of the image forming apparatus 200 based on the information input via the operation display unit 40.

In addition, in this embodiment, in each image forming portion P, the photosensitive drum 1, the charging roller 2 as a process means which acts on the photosensitive drum 1, and the drum cleaning device 4 configure a drum unit which is dismountable from the main assembly 201 in an integrated manner. In addition, in each image forming portion P, the developing device 4 configures a developing unit which is dismountable from the main assembly 201 substantially alone. In addition, the intermediary transfer belt 7, each of the stretching rollers 8, 17, 18, 19, each of the primary transfer rollers 5, and the belt cleaning device 11 configure an intermediary transfer unit 20 which is dismountable from the main assembly 201 in an integrated manner.

2. Intermediary Transfer Unit

Next, the configuration of the intermediary transfer unit 20 as a belt feeding device in this embodiment will be further described. Here, a front side of the drawing sheet of FIG. 1 is a front side, and a rear side of the drawing sheet of FIG. 1 is a rear side with respect to the image forming apparatus 200 and its elements. A direction connecting the front side and the rear side is assumed to be substantially parallel to a direction of a rotational axis of the photosensitive drum 1. In addition, with respect to the image forming apparatus 200 and its elements, an up-down direction refers to up and down in a direction of gravity (a vertical direction), but it does not mean only directly above and below respectively, but also include above and below a horizontal plane passing through an element or a position which is focused on respectively.

Figure 2:
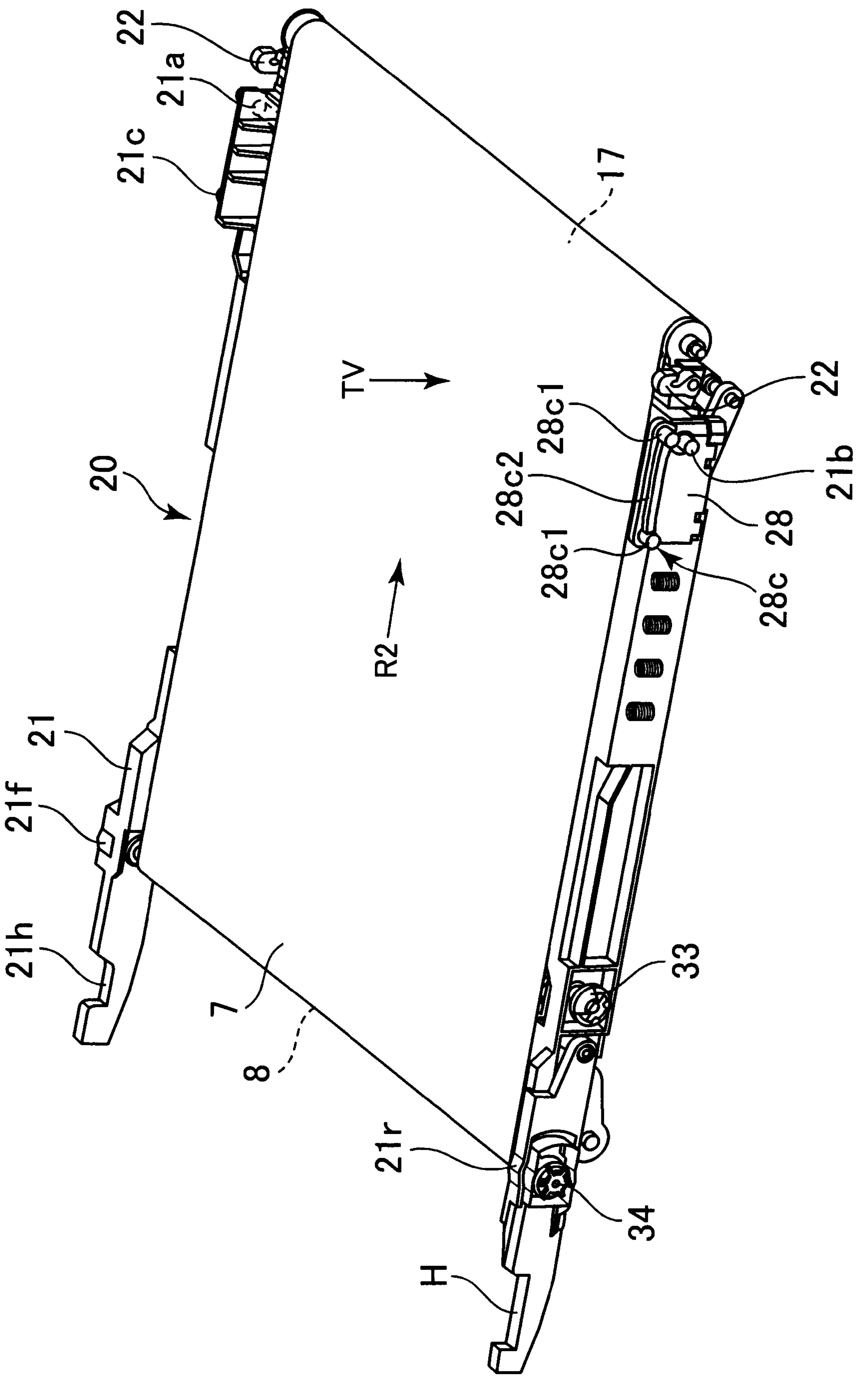
FIG. 2 is a perspective view showing an intermediary transfer unit.
Figure 3:
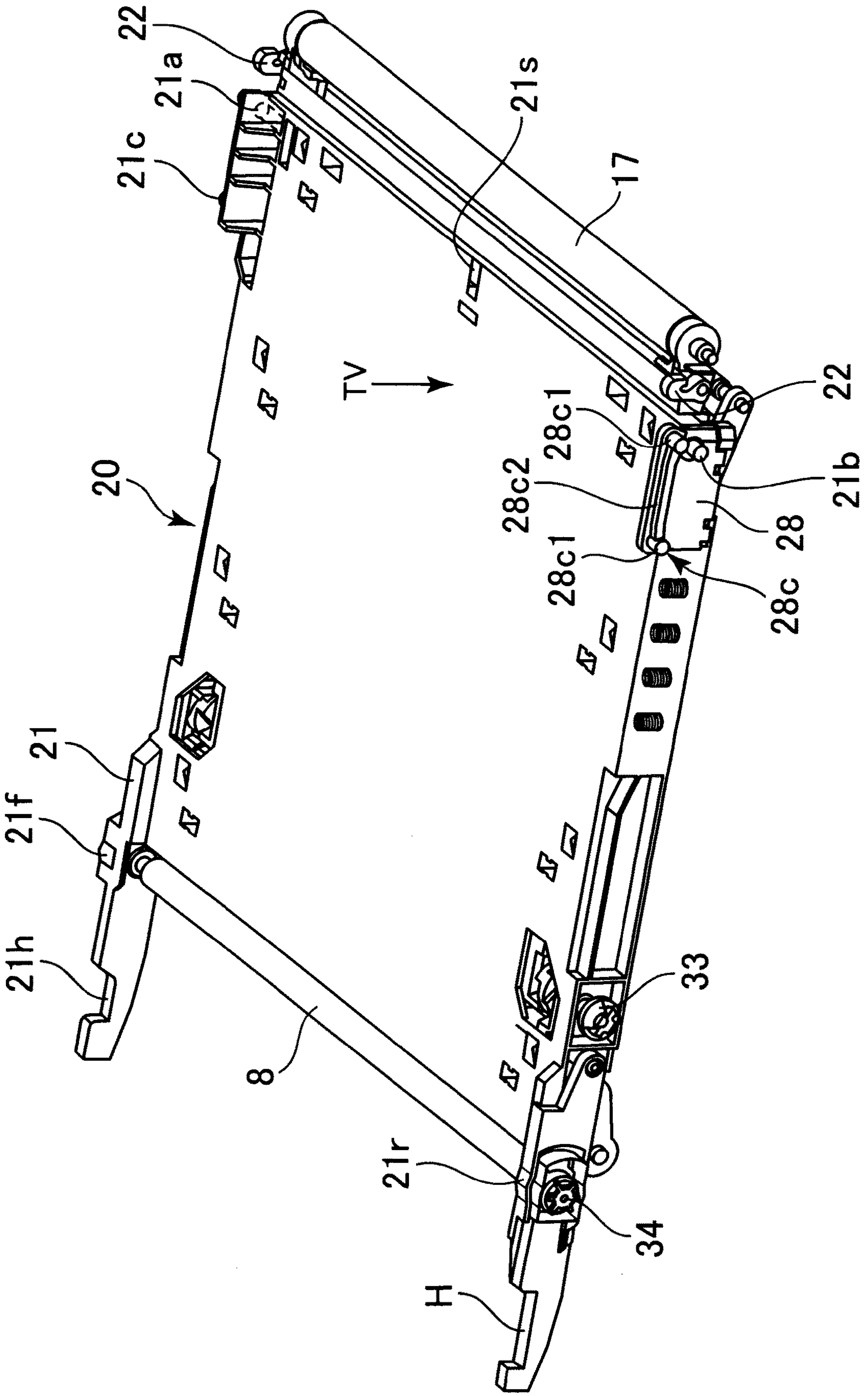
FIG. 3 is a perspective view showing an intermediary transfer unit with a state that an intermediary transfer belt is removed.

FIG. 2 is a perspective view of the intermediary transfer unit 20 obliquely from above on the rear side. In addition, FIG. 3 is a perspective view of the intermediary transfer unit 20 obliquely from above, while the intermediary transfer belt 7 is removed. Incidentally, in FIG. 2 and FIG. 3 (as well as in FIG. 10, FIG. 12, and FIG. 13, as will be described below), a drawing of the belt cleaning device 11 is omitted for simplicity.

As shown in FIG. 2 and FIG. 3, the intermediary transfer unit 20 includes a transfer frame 21 as a frame (a holding member) of the intermediary transfer unit 20, which is supported by transfer rails 78F and 78R (FIG. 10) as guide members, as will be described below. The transfer frame 21 is provided with first positioning portions 21*f* and 21*r*, and second positioning portions 21*a* and 21*b*, in order to mount the intermediary transfer unit 20 to the transfer rails 78F and 78R. The first positioning portion 21*f* and the second positioning portion 21*a* are respectively provided on the front side of the transfer frame 21, and the first positioning portions 21*r* and 21*b* are respectively provided on the rear side of the transfer frame 21. The first positioning portions 21*f* and 21*r* are arranged substantially symmetrically with respect to a center of the width direction of the intermediary transfer belt 7, and are configured to have arc-shaped sides on the substantially same axis as the secondary transfer inner roller 8, respectively. The second positioning portions 21*a* and 21*b* are arranged substantially symmetrically with respect to the center of the width direction of the intermediary transfer belt 7, and are configured to have cylindrical shapes which extend to the front side and the rear side on the substantially same axis, respectively. The intermediary transfer unit 20 is mounted and positioned in the main assembly 201 via four positioning portions of the first positioning portions 21*f* and 21*r*, and the second positioning portions 12*a* and 12*b*. This forms a section of the image forming apparatus 200 shown in FIG. 1. Furthermore, the third positioning portions 21*c* and 28*c* are provided on the front side of the transfer frame 21 and a positioning plate 28 which is attached to the rear side of the transfer frame 21, respectively. As shown in FIG. 2, the third positioning portion 28*c* includes two cylindrical portions 28*c*1 and 28*c*1 which extend to the rear side, and a connecting portion (horizontal portion) 28*c*2 which connects these two cylindrical portions 28*c*1 and 28*c*1. The connecting portion 28*c*2 extends in a direction along a tangent plane of the intermediary transfer belt 7 side of a plurality of the photosensitive drums from 1*a* through 1*d* to connect the two cylindrical portions 28*c*1 and 28*c*1. In FIG. 2, only the second positioning portion 28*c* on the rear side is illustrated in detail, however, the third positioning portions 21*c* and 28*c* are configured to be arranged substantially symmetrically with respect to the center of the width direction of the intermediary transfer belt 7. Functions of the third positioning portions 21*c* and 28*c* will be described below.

While the secondary transfer inner roller 8, the upstream guide roller 18, and the spacing roller 19 are sandwiched between the front side and the rear side of the transfer frame 21 respectively, both ends of their respective rotational axial directions are rotatably supported via bearing members on each of the sides described above. Here, the rotational axial direction of the secondary transfer inner roller 8, the upstream guide roller 18, and the spacing roller 19 is assumed to be the width direction of the intermediary transfer belt 7 (a direction substantially perpendicular to the feeding direction of the intermediary transfer belt 7). Incidentally, the rotational axial directions of the secondary transfer inner roller 8, the upstream guide roller 18, and the spacing roller 19 are substantially parallel to the rotational axial directions of the respective photosensitive drums 1*a* through 1*d*. In addition, as will be described below, the self-alignment mechanism 17U including the steering roller 17 is supported by a steering support portion 21*s* provided with the transfer frame 21.

A driving coupling 34 as a driving transmission means is attached to one end portion (an end portion of the rear side end in this embodiment) in a rotational axis direction of the secondary transfer inner roller 8 which have a function of a driving roller. The driving coupling 34 is connected to an output shaft of a belt driving unit (not shown) provided in the main assembly 201 and transmits a driving force from the belt driving unit to the secondary transfer inner roller 8, while the intermediary transfer unit 20 is mounted in the main assembly 201. The belt driving unit includes a driving source such as a motor and a coupling member which engages the driving coupling 34. The secondary transfer inner roller 8 includes a surface comprised of a material whose friction coefficient against the intermediary transfer belt 7 is relatively high such as rubber and feeds the intermediary transfer belt 7 in a direction of an arrow R2 in FIG. 2 by transmitting a driving force via the driving coupling 34. Incidentally, in this embodiment, the driving coupling 34 is used as the driving transmission means, however, the present invention is not limited to this manner. For example, a driving source provided in the main assembly 201 and a driving roller provided in the intermediary transfer unit 20 may be connected by using a separatable gear as the driving transmission means.

Figure 4:
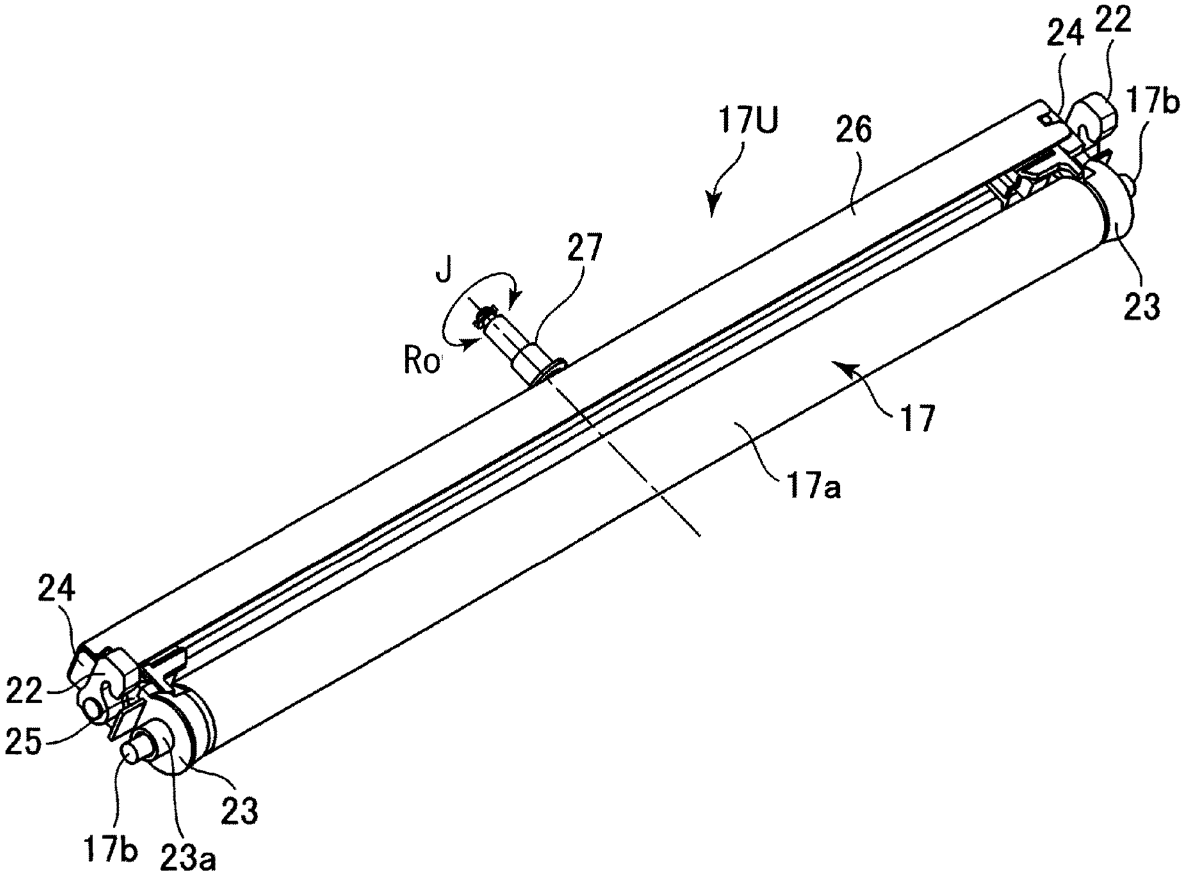
FIG. 4 is a perspective view showing a self-alignment mechanism.
Figure 5:
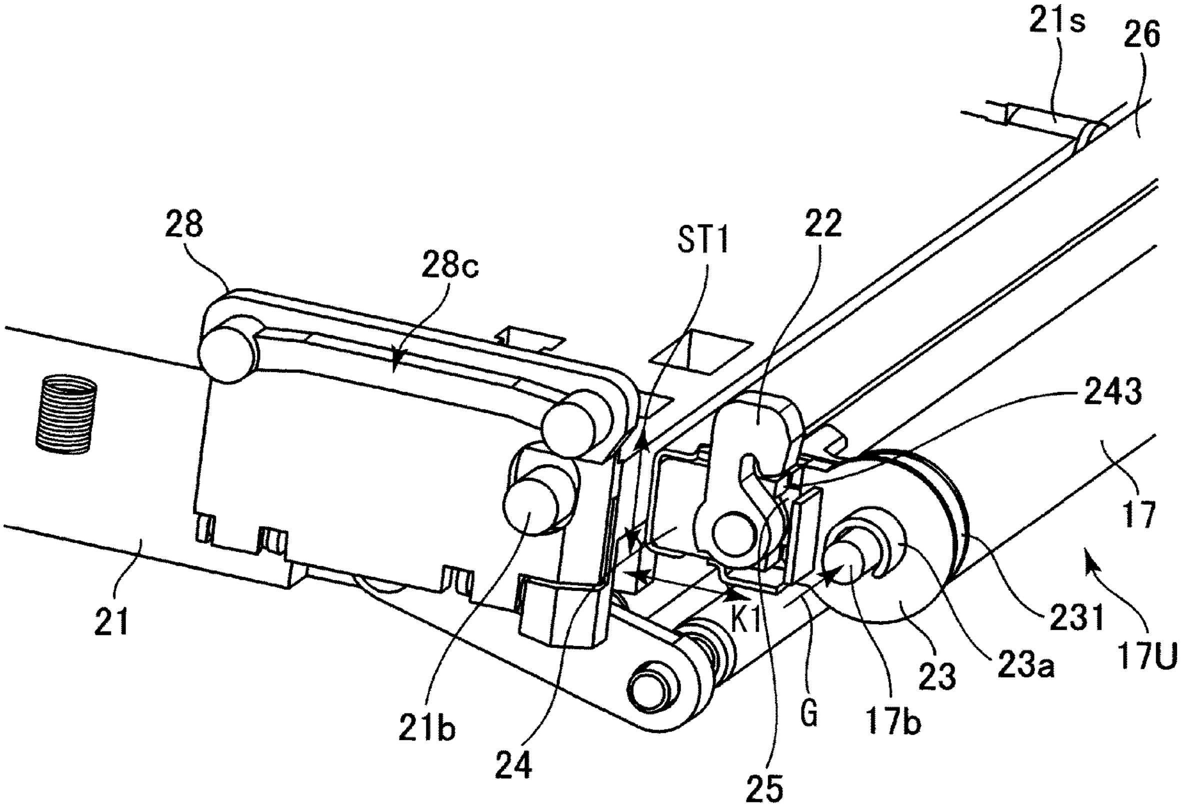
FIG. 5 is a perspective view showing an end portion of a self-alignment mechanism.

FIG. 4 and FIG. 5 are perspective views illustrating a configuration of the self-alignment mechanism 17U in this embodiment. FIG. 4 is a perspective view showing the entire self-alignment mechanism 17U obliquely from above on the rear side, and FIG. 5 is a perspective view showing a vicinity of an end portion on the rear side of the self-alignment mechanism 17U. In this embodiment, the self-alignment mechanism 17U consists of the steering roller 17, as well as a steering bearing 23, a slide guide 24, a tension spring 25 and a swingable plate 26 as will be described below.

In this embodiment, the intermediary transfer unit 20 includes the self-alignment mechanism 17U as a steering mechanism. The self-alignment mechanism 17U is configured to automatically move the steering roller 17 so as to maintain a balance of frictional forces at both end portions in a direction of a rotational axis of the steering roller 17 against the intermediary transfer belt 7 being fed as described above. As a result, the self-alignment mechanism 17U is capable of controlling a movement of the intermediary transfer belt 7 and aligning (steering) of the intermediary transfer belt 7, that is, controlling a position in the width direction of the intermediary transfer belt 7, without requiring a sensor or an actuator.

As shown in FIG. 4, the steering roller 17 includes a cylindrical roller body 17*a* and a roller shaft 17*b* which protrudes outward from both end portions of the roller body 17*a* with respect to a direction of a rotational axis of the steering roller 17. Steering bearings 23 as bearing members are arranged at positions opposing both end portions in a direction of a rotational axis of the roller body 17*a*, respectively. Each of roller shafts 17*b* is rotatably supported by the steering bearing 23 in the form of being inserted into a support portion (a bearing portion) 23*a* which is provided with the corresponding steering bearing 23. A pair of steering bearings 23 is supported by the swingable plate 26 as a support member, while supporting both end portions in the direction of the rotational axis of the steering roller 17. That is, each of steering bearings 23 is slidably supported by the slide guide 24 as a bearing support member, attached to both end portions in a direction of a longitudinal direction of the swingable plate 26, which is substantially parallel to the direction of the rotational axis of the steering roller 17. Between the steering bearing 23 and the slide guide 24, the tension spring 25 which is comprised of a compressed coil spring, which is an urging member as an urging means, is provided in a compressed state. A pair of tension springs 25 applies an urging force against a pair of steering bearings 23 at both end portions of a longitudinal direction of the swingable plate 26, respectively. The swingable plate 26 configures a swingable member, which supports the steering roller 17, in a state that a relative alignment of the steering roller 17 with other stretching rollers such as the secondary transfer inner roller 8 is adjustable by moving (rotating or tilting) the steering roller 17. Incidentally, an alignment of the steering roller 17 with respect to other stretching rollers such as the secondary transfer inner roller 8 is also referred to simply as an alignment of the steering roller 17. In addition, the tensioning spring 25 configures a tension applying means which applies a tension to intermediary transfer belt 7 by pressing the steering roller 17 against an inner peripheral surface of the intermediary transfer belt 7.

As shown in FIG. 4 and FIG. 5, the slide guide 24 includes an engaging groove (recessed portion) 243 which guides the steering bearing 23 to move in a direction of an arrow K1 in FIG. 5, that is, along an urging direction (a pressing direction) of the tension spring 25 to the intermediary transfer belt 7 (pressure direction). In the engaging groove 243, one end portion of the tension spring 25 abuts with a bearing surface provided with the slide guide 24 and the other end portion abuts with a bearing surface provided with the steering bearing 23. That is, a pair of slide guides 24 configures a guiding portion which guides a pair of steering bearings 23 along an urging direction (a pressing direction) of the tension spring 25 against an intermediary transfer belt 7, respectively. This allows an urging force of each tension spring 25 to be effectively transmitted to a corresponding steering bearing 23. In addition, each slide guide 24 includes a locking member 22 which restricts a movement of the steering bearing 23 in an urging direction (a pressing direction) of the tension spring 25 against the intermediary transfer belt 7 by opposing the urging force of each tension spring 25, respectively. The locking member 22 configures a dismountable 23 U as will be described below. And the locking member 22 has a function of preventing the steering bearing 23 and the tension spring 25 from falling from the slide guide 24 in a group of components which configure the dismountable unit 23U. In addition, the locking member 22 has a function of preventing the steering bearing 23 and the steering roller 17 from falling from the swingable plate 26 in an assembly state when the self-alignment mechanism 17U is not mounted to the intermediary transfer unit 20.

As shown in FIG. 2, in a state that the intermediary transfer belt 7 is stretched over a plurality of tension rollers 8, 17, 18, and 19, the steering bearing 23 moves in a direction of compressing the tension spring 25. Therefore, in this state, the steering roller 17 is pressed against the inner peripheral surface of the intermediary transfer belt 7 by a repulsion force of the tension spring 25, and a tension force is generated in the intermediary transfer belt 7. Thus, in this embodiment, the steering roller 17 also serves as a tension roller (tension applying roller) which provides an appropriate tension to the intermediary transfer belt 7 by the urging force from the tension spring 25.

As shown in FIG. 4, the swingable plate 26 has a rotatable shaft member 27 as a support shaft fixed in a center portion in its longitudinal direction, protruding toward the transfer frame 21 along a tangent plane in the intermediary transfer belt 7 side of a plurality of photosensitive drums 1*a* through 1*d*. In addition, the swingable plate 26 has slide guides 24 mounted to both end portions in its longitudinal direction. As shown in FIG. 3 and FIG. 5, the rotatable shaft member 27 is fitted, in a rotatable state, to the steering support portion 21*s* provided with the transfer frame 21. As a result, the swingable plate 26 is supported by the transfer frame 21 in a swingable (rotatable, tiltable) manner. As shown in FIG. 4, the swingable plate 26 is swingable in a moving direction Ro around a steering axis line J, which is an axis line of the rotatable shaft member 27, while supporting the steering roller 17. As a result, the end portions in the longitudinal direction of the swingable plate 26 is swingable in an up-down direction in the figure along a direction of ST1 in FIG. 5. Thus, the self-alignment mechanism 17U as an alignment changing means for changing an alignment of the steering roller 17 is configured as a swingable unit with respect to the transfer frame 21 together with the steering roller 17.

3. Detailed Configuration and Action of the Self-Alignment Mechanism

Figure 6:
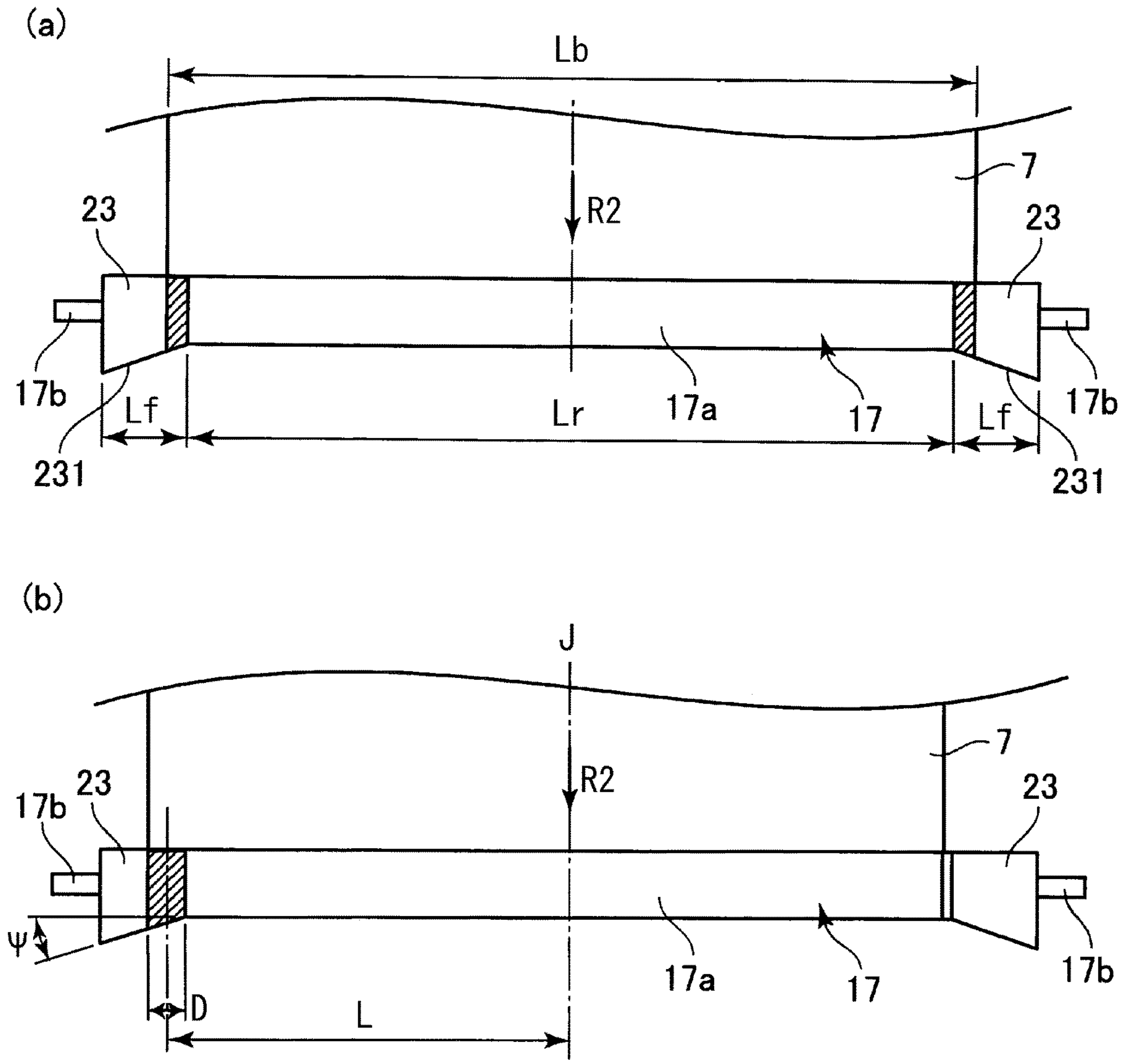
FIG. 6, part(a) and part(b), is a schematic view to illustrate a working principle of a self-alignment mechanism.

Next, more detailed configuration and action of the self-alignment mechanism 17U in this embodiment will be described with reference to FIG. 5 and FIG. 6. FIG. 6, parts (a) and (b), is schematic plan views (top views) of the self-alignment mechanism 17U as seen from a direction of an arrow TV in FIG. 2 and FIG. 3, that is, a direction substantially perpendicular to a surface of the intermediary transfer belt 7 which is formed by the secondary transfer inner roller 8 and the steering roller 17. Incidentally, in this embodiment, a plane of the intermediary transfer belt 7 and a tangent plane of a plural of photosensitive drums from 1*a* through 1*d* on a side of the intermediary transfer belt 7 are substantially parallel, and these planes are arranged substantially horizontally in the image forming apparatus 200. Part (a) of FIG. 6 shows a steady state in which forces acting on both end portions in the width direction of the intermediary transfer belt Tare balanced by the action of the self-alignment mechanism 17U, that is, a hanging position of the intermediary transfer belt 7 is at a nominal position. Part (b) of FIG. 6 shows a state in which the intermediary transfer belt 7 leans to a left in the figure, when the intermediary transfer belt 7 is being fed in a direction of an arrow R2 in the figure.

As shown in FIG. 5, the steering bearing 23, which supports the roller shaft 17*b* of the steering roller 17, includes a sliding surface 231 as a sliding portion (a friction portion) for generating a steering torque by sliding (sliding on) with the inner peripheral surface of the intermediary transfer belt 7. However, the steering torque refers to a moment of force which attempts to change the alignment of the steering roller 17 toward a direction in which belt leaning will be reduced. As described above, the steering bearing 23 is restricted in a direction of movement by the slide guide 24 so that it slides along the direction of the arrow K1 in FIG. 5. Therefore, the steering bearing 23 is capable of sliding on the inner peripheral surface of the intermediary transfer belt 7 without being driven by the intermediary transfer belt 7 when the intermediary transfer belt 7 is fed.

The sliding surface 231 is formed in a tapered shape in which an outer diameter gradually increases as it goes outward in the direction of the rotational axis of the steering roller 17, and has a maximum diameter which is larger than an outer diameter of the cylindrical steering roller 17. As shown in part (b) of FIG. 6, in this embodiment, the outer diameter of the steering roller 17 is set to 16 mm (φ16). The sliding surface 231 of the steering bearing 23 includes a circumferential outer peripheral portion with an outer diameter of 16 mm (φ16), which is the same as the outer diameter of the steering roller 17 at an adjacent portion (a joint portion) with the steering roller 17. And the sliding surface 231 of the steering bearing 23 has a curved surface shape which gradually increases in diameter from this outer peripheral portion outward at a rate of a taper angle ψ=10 degrees. Incidentally, this taper angle ψ is an angle between the direction of the rotational axis of the steering roller 17 and the sliding surface 231 of the steering bearing 23 as viewed in a direction perpendicular to the direction of the rotational axis of the steering roller 17.

In addition, in this embodiment, a dimension in the width direction of the intermediary transfer belt 7 is set so that a part of the intermediary transfer belt 7 extends over a region of the sliding surface 231 which has a taper angle ψ. In other words, the dimension in the width direction of the intermediary transfer belt 7 is set as follows. That is, the width of the intermediary transfer belt 7 is defined as "Lb". In addition, a length of the roller body 17*a* with respect to the direction of the rotational axis of the steering roller 17 is defined as "Lr". In addition, a length of the sliding surface 231 of each steering bearing 23 with respect to the direction of the rotational axis of the steering roller 17 is defined as "Lf". A width between the end portions of each steering bearing 23 in the direction of the rotational axis of the steering roller 17 is described as "Lr+2Lf". At this time, the width "Lb" is set to be longer than the length "Lr" and shorter than the width "Lr+2Lf" (Lr<Lb<L+2Lf).

An operating principle, which enables a self-alignment by the intermediary transfer belt 7 sliding on the sliding surface 231 of the steering bearing 23, will be described with reference to FIG. 6. As described above, the steering bearing 23 is capable of sliding on the inner peripheral surface of the intermediary transfer belt 7 during feeding the intermediary transfer belt 7, since the steering bearing 23 is supported without driven by the intermediary transfer belt 7. At this time, a frictional force between the intermediary transfer belt 7 and the steering bearing 23 occurs in a region where the intermediary transfer belt 7 is wound around the steering bearing 23. That is, this frictional force occurs in a region of a right side of the steering bearing 23 where the intermediary transfer belt 7 moves downward, as the intermediary transfer unit 20 is viewed from the rear side along the direction of the rotational axis of the steering roller 17 as shown by an arrow G in FIG. 5. Therefore, a downward frictional force acts on the steering bearing 23.

As described above, the dimension (Lb) in the width direction of the intermediary transfer belt 7 is set so that the intermediary transfer belt 7 extends over the taper shaped sliding surface 231 of the steering bearing 23. Thus, a steady state (a nominal state) as shown in part (a) of FIG. 6 is as will be described below. That is, the intermediary transfer belt 7 slides on both sides of the sliding surfaces 231 of the steering bearings 23 with a same hanging width (for example 2 mm). In this state, moments generated by frictional forces acting from the intermediary transfer belt 7 to the steering bearings 23 on both sides cancel each other. In other words, the frictional forces, received by each steering bearing 23 from the intermediary transfer belt 7, acts on the steering bearings 23 and the swingable plate 26 as moments in mutually opposite directions which is centered on the steering axis line J. Therefore, in the steady state as shown in part (a) of FIG. 6, an attitude of the swingable plate is maintained, since the frictional forces received by each steering bearing 23 are approximately equal and the moments cancel each other. As a result, the steering roller 17 is maintained in a attitude in which the direction of the rotational axis is substantially parallel (a state that an alignment is aligned) to other stretching rollers such as the secondary transfer inner roller 8.

On the other hand, as shown in part (b) of FIG. 6, a state that the intermediary transfer belt 7 is leaned to one side in the width direction, that is, "belt leaning" is as will be described below. That is, a hanging width of the intermediary transfer belt 7 to one of the steering bearings 23 becomes larger than a hanging width of the intermediary transfer belt 7 to the other steering bearing 23. In the embodiment shown in the figure, a hanging width of the intermediary transfer belt 7 for the steering bearing 23 on a left side of the figure is D [mm], and a hanging width of the intermediary transfer belt 7 for the steering bearing 23 on a right side of the figure is 0 [mm]. In other words, the intermediary transfer belt 7 is detached from the sliding surface 231 of the steering bearing 23 on the right side of the figure. In this case, when the downward frictional force described above, which a range of a hanging width of the sliding surface 231 of the steering bearing 23 is received by the intermediary transfer belt 7, is F(ST), a force which one of the steering bearings 23 is received is F(ST)*D. On the other hand, the other steering bearing 23 receives substantially no force from the intermediary transfer belt 7, because a hanging width of the intermediary transfer belt 7 is 0 [mm]. Therefore, in a state shown in part (b) of FIG. 6, a steering torque is generated to move a left end portion of the steering roller 17 downward (toward a rear side of the drawing sheet of FIG. 6).

A steering angle of the steering roller 17 caused by a principle described above, that is, an inclined angle of the steering roller 17 in a state of moving according to a steering torque, consists with a direction of restoring the belt leaning. Thus, the belt leaning is reduced as the intermediary transfer belt 7 is fed. In this way, the self-alignment mechanism 17U exerts a self-alignment effect which controls a position in the width direction of the intermediary transfer belt 7 by converting a part of a driving force which feeds the intermediary transfer belt 7 into a steering torque.

Incidentally, in this embodiment, the self-alignment mechanism 17U is configured to provide a taper angle ψ on the sliding surface 231 of the steering bearing 23, to set a friction coefficient μS of the steering bearing 23 against the intermediary transfer belt 7 relatively low, and to suppress a sudden steering operation. Specifically, in this embodiment, a resin material such as POM (polyacetal) which has sliding properties (low friction properties) is used as a material of the steering bearing 23. In addition, a coefficient of friction (a coefficient of kinetic friction) μS of the steering bearing 23 (the sliding surface 231) against the intermediary transfer belt 7 is set to approximately 0.3. In addition, in this embodiment, a taper angle ψ of the sliding surface 231 of the steering bearing 23 is set to approximately 5 to 10 degrees. Thus, a favorable self-alignment effect is obtained by suppressing a sudden steering operation. In addition, in this embodiment, the steering bearing 23 is also provided with electrical conductivity in consideration of an electrostatic adverse effect caused by frictional charging with the intermediary transfer belt 7. However, in a case that a required steering torque is obtained, a taper angle ψ and sliding properties of the steering bearing 23 may be different from those of this embodiment. For example, the sliding surface 231 of the steering bearing 23 may be cylindrical (ψ=0 degrees).

4. Spacing Mechanism of the Intermediary Transfer Belt

Figure 7:
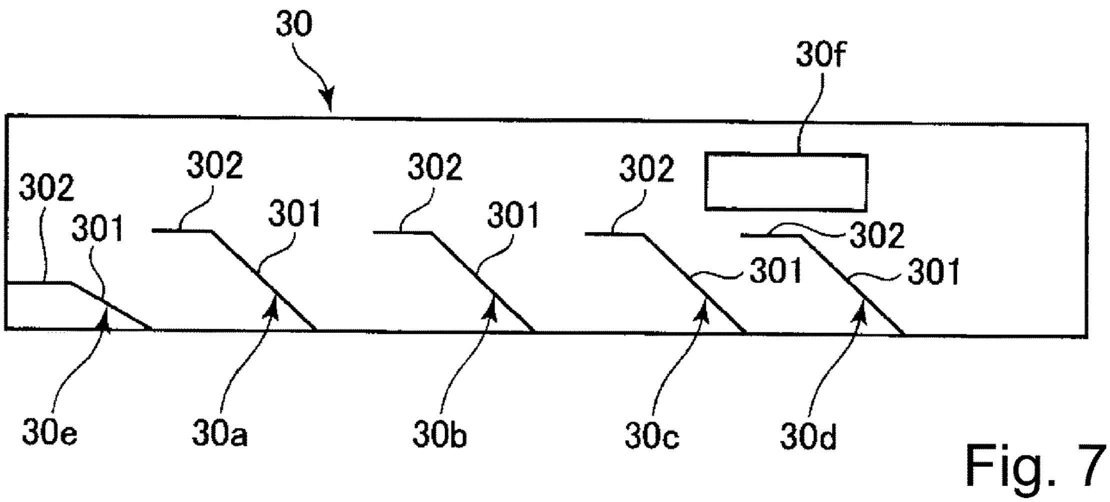
FIG. 7 is a schematic view showing a spacing slider.
Figure 8:
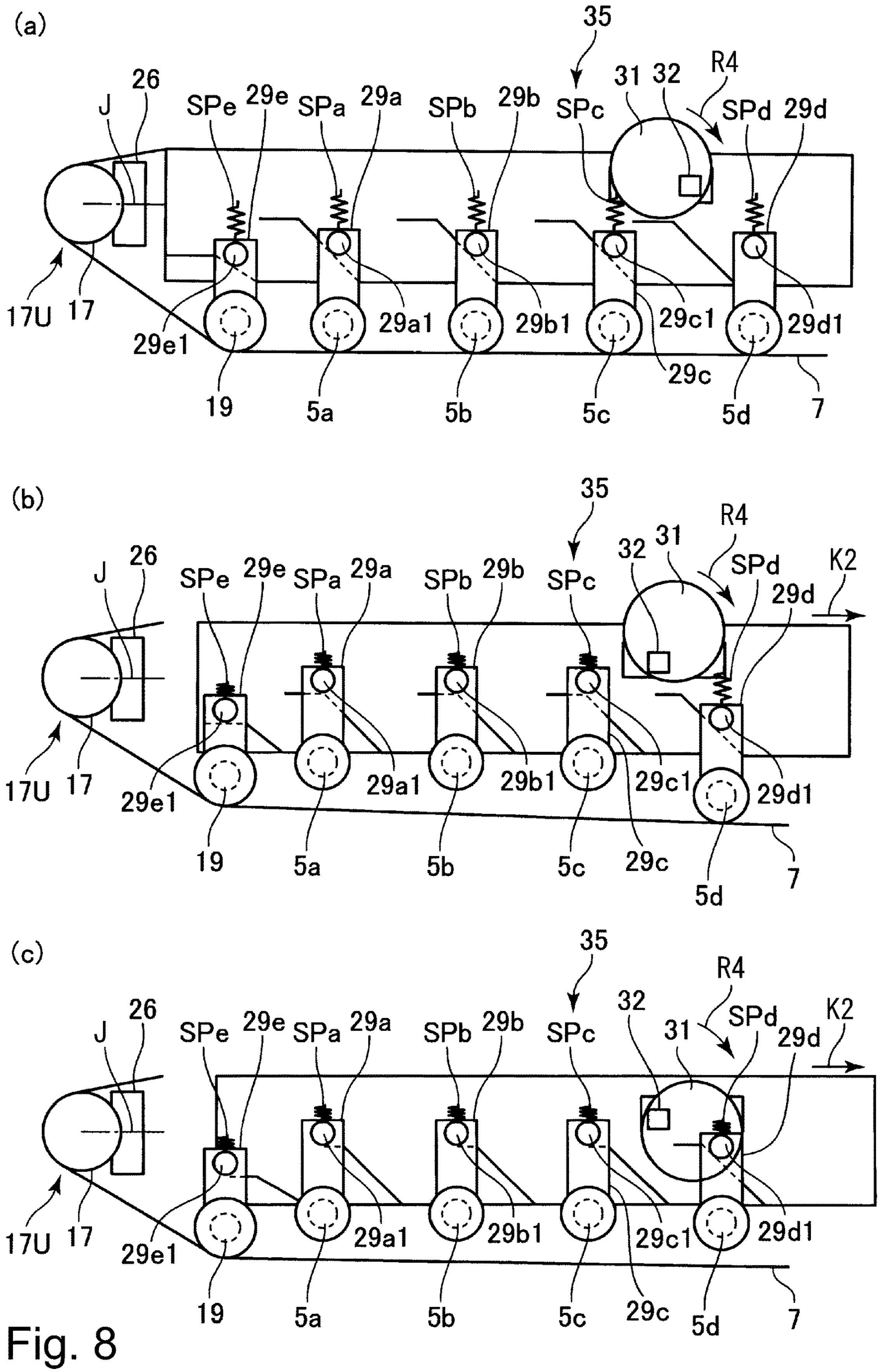
FIG. 8, part(a), part(b) and part(c), is a schematic view to illustrate an operation of a spacing mechanism.

Next, the spacing mechanism 35 as a moving mechanism to enable to space the intermediary transfer belt 7 from the photosensitive drums from 1*a* through 1*d* in this embodiment will be described with reference to FIG. 7 and FIG. 8. FIG. 7 is a schematic side view from the front side showing a spacing slider 30 as will be described below, which configures the spacing mechanism 35. FIG. 8 is a schematic side view from the front side showing the spacing mechanism 35 to illustrate a spacing operation by the spacing mechanism 35. Part (a) of FIG. 8 shows a state of a color mode (hereinafter referred to as a "CL mode"), part (b) of FIG. 8 shows a state of a monochrome mode (hereinafter referred to as a "BK mode"), and part (c) of FIG. 8 shows a state of full spacing mode. In this embodiment, the spacing mechanism 35 consists of the spacing slider 30, a spacing cam 31, and a spacing cam shaft 32 etc., as will be described below.

As described above, four primary transfer rollers from 5*a* through 5*d* are arranged on the inner peripheral surface of the intermediary transfer belt 7, corresponding to four photosensitive drums from 1*a* through 1*d* respectively. In this embodiment, these primary transfer rollers from 5*a* through 5*d* and the spacing roller 19 which is located upstream from these primary transfer rollers from 5*a* through 5*d* with respect to the rotational direction of the intermediary transfer belt 7, are movable relative to the transfer frame 21. In this embodiment, each of the primary transfer rollers from 5*a* through 5*d* and the spacing roller 19 are slidable along an up-down direction in FIG. 8, that is, a direction of approaching and leaving a tangent plane of a plurality of photosensitive drums from 1*a* through 1*d* on a side of the intermediary transfer belt 7.

The primary transfer rollers from 5*a* through 5*d* and the spacing roller 19 are moved by a slide operation of the spacing slider 30 as a moving member shown in FIG. 7. The spacing sliders 30 are accommodated inside the transfer frame 21 adjacent to the front side and the rear side of the transfer frame 21 (see FIG. 2 and FIG. 3) of the intermediary transfer unit 20, respectively. The spacing sliders 30 arranged on the front side and the rear side of the transfer frame 21 respectively, have a similar shape (substantially symmetrical with respect to a center of the width direction of the intermediary transfer belt 7) shape. The spacing sliders 30 have four cam surfaces 30*a*, 30*b*, 30*c*, and 30*d* corresponding to the four primary transfer rollers from 5*a* through 5*d* respectively, and one cam surface 30*e* corresponding to the spacing roller 19. The spacing slider 30 is held by the transfer frame 21, so that it is slidable along a left-right direction in the figure, that is, a direction along a tangent plane of the intermediary transfer belt 7 side of a plurality of photosensitive drums from 1*a* through 1*d*. The spacing sliders 30, which are arranged on the front side and the rear side of the transfer frame 21 respectively, are configured to slide synchronously in the direction described above.

Each of the cam surfaces from 30*a* through 30*e* of the spacing slider 30 includes a inclined surface 301 which is inclined to a sliding direction of the spacing slider 30 and a flat portion 302 which is substantially parallel to a sliding direction of the spacing slider 30, respectively. Each of the cam surfaces from 30*a* through 30*e* is formed to achieve operations of each of primary transfer rollers from 5*a* through 5*d* and the spacing roller 19 in a switching of modes as will be described below. For example, the cam surface 30*e* corresponding to the spacing roller 19 includes the inclined surface 301 corresponding to a lower position in the figure of the spacing roller 19 and the flat portion 302 corresponding to an upper position in the figure of the spacing roller 19.

As shown in FIG. 8, parts (a), (b) and (c), each of primary transfer rollers from 5*a* through 5*d* is rotatably supported at both end portions in a direction of a rotational axis by corresponding primary transfer bearings from 29*a* through 29*d*, respectively. Each of the primary transfer bearings from 29*a* through 29*d* is held by the transfer frame 21 at both end portions in the direction of the rotational axis of the primary transfer rollers from 5*a* through 5*d*, respectively. Each of the primary transfer bearings from 29*a* though 29*d* is held by the transfer frame 21 while it is fitted movable along an up-down direction in the figure, that is, a direction approaching and leaving a tangent plane of the intermediary transfer belt 7 side of a plurality of photosensitive drums from 1*a* through 1*d*. In addition, each of the primary transfer bearings from 29*a* through 29*d* is restricted from moving in a left-right direction in the figure, that is, in a direction along a tangent plane of the intermediary transfer belt 7 side of a plurality of photosensitive drums from 1*a* through 1*d*. Each of the primary transfer bearings from 29*a* through 29*d* is provide with an abutting portion from 29*a*1 through 29*d*1 which abuts with each of the cam surfaces from 30*a* through 30*d* of the spacing slider 30, respectively. In addition, between each of the primary transfer bearings from 29*a* through 29*d* and the transfer frame 21, primary transfer springs from SPa through SPd which is comprised of compressed coil springs, which are urging members as urging means, are provided. The primary transfer springs from SPa through SPd urge each of primary transfer bearings from 29*a* through 29*d* downward in the figure so as to press the cam surfaces from 30*a* through 30*d*. When the spacing slider 30 slides, each of the primary transfer bearings from 29*a* through 29*d* moves along an up-down direction in the figure in a state that each of abutting portions from 29*a*1 through 29*d*1 abuts with each of the cam surfaces from 30*a* through 30*d*, thereby, each of the primary transfer rollers from 5*a* through 5*d* moves along the up-down direction in the figure.

As shown in FIG. 8, parts (a), (b), and 8(*c*), the spacing roller 19 is also movable in the same manner as the primary transfer rollers from 5*a* through 5*d*. That is, the spacing roller 19 is rotatably supported at both end portions in the direction of the rotational axis by a spacing roller bearings 29*e*. The spacing roller bearings 29*e* are held by the transfer frame 21 at both end portions in the direction of the spacing roller 19. The spacing roller bearings 29*e* are held by the transfer frame 21, while it is fitted movable along the up-down direction in the figure, that is, the direction of approaching and leaving the tangential plane of the intermediary transfer belt 7 side of a plurality of photosensitive drums from 1*a* through 1*d*. The spacing roller bearings 29*e* is restricted from moving in the left-right direction in the figure, that is, in the direction along the tangent plane of the intermediary transfer belt 7 side of a plurality of photosensitive drums from 1*a* through 1*d*. The spacing roller bearings 29*e* are provided with abutting portions 29*e*1 which abut with the cam surfaces 30*e* of the spacing slider 30. In addition, between the spacing roller bearings 29*e* and the transfer frame 21, spacing roller springs SPe which is comprised of composed coil springs, which are urging members as urging means, are provided. The spacing roller springs SPe urge the spacing roller bearings 29*e* downward in the figure so as to press the cam surfaces 30*e*. When the spacing slider 30 slides, the spacing roller bearings 29*e* move along the up-down direction in the figure in a state that abutting portions abut with the cam surfaces 30*e*, thereby, the spacing roller 19 moves along the up-down direction in the figure.

The spacing slider 30 includes a slide urging surface 30*f* (FIG. 7) which engages the spacing cam 31 attached to the spacing cam shaft 32. The spacing slider 30 is urged in the left-right direction in the figure, that is, along the tangent plane of the intermediary transfer belt 7 side of a plurality of photosensitive drums from 1*a* through 1*d*, by pressing the slide urging surface 30*f* by the spacing cam 31. The spacing cam shaft 32 is held between a front side portion and a rear side portion of the transfer frame 21 and rotatably supported by each of the side portions described above via bearing members at both end portions in the direction of the rotational axis. In addition, each of spacing cams 31 is fixed to both end portions in the direction of the rotational axis of the spacing cam shafts 32, respectively. A spacing coupling 33 (FIG. 2), which is connected to a driving source provided in the main assembly 201 while the intermediary transfer unit 20 is mounted in the main assembly 201, is attached to one end portion in the direction of the rotational axis of the spacing cam shaft 32 (an end portion of the rear side in this embodiment). The spacing slider 30 is movable in a direction intersecting a moving direction of the primary transfer bearings from 29*a* through 29*d* and the spacing roller bearing 29*e*.

In this embodiment, each of the primary transfer rollers from 5*a* through 5*d* and the spacing roller 19 are moved by the spacing mechanism 35 equipped with the spacing slider 30 and the spacing cam 31, and switching of modes shown in FIG. 8, parts (a), (b) and (c), respectively, is performed. Incidentally, this switching of modes is achieved by controlling the rotational phase of the spacing cam shaft 32 based on a control signal from the CPU 50 (FIG. 1) provided with the image forming apparatus 200. In addition, a case of an operation, which switches the CL mode, the BK mode, and the full spacing mode in order, will be described here as an example, however, it is possible to switch between any modes by operating in reverse order.

In the CL mode shown in part (a) of FIG. 8, each of the primary transfer rollers from 5*a* through 5*d* and the spacing roller 19 are all held in a lower position in the figure, and the intermediary transfer belt 7 abuts with each of the photosensitive drums from 1*a* through 1*d*. In this state, a full color image on a recording material S is formed, by forming a toner image on each of the photosensitive drums from 1*a* through 1*d* and transferring the toner image to the recording material S via the intermediary transfer belt 7.

In a case of switching from the CL mode shown in part (a) of FIG. 8 to the BK mode shown in part (b) of FIG. 8, the spacing cam 31 rotates 90 degrees in the direction of the arrow R4 (a clockwise direction) in the figure, and the spacing slider 30 slides in a right direction in the figure (a direction of an arrow K2 in part (b) of FIG. 8). In a case of the BK mode, the primary transfer rollers 5*a*, 5*b*, and 5*c* for each color of yellow, magenta, and cyan, move to an upper position in the figure and separate from the inner peripheral surface of the intermediary transfer belt 7, and the spacing roller 19 also moves to an upper position in the figure. At this time, the intermediary transfer belt 7 is stretched between the spacing roller 19 in the upper position in the figure and the primary transfer roller 5*d* for black which is still held in the lower position in the figure, and is spaced from the photosensitive drums 1*a*, 1*b*, and 1*c* except the photosensitive drum 1*d* for black. In this state, a monochrome image is formed on a recording material S by forming a toner image on the photosensitive drum 1*d* for black and transferring the toner image to the recording material S via the intermediary transfer belt 7.

In a case of switching from the BK mode shown in part (b) of FIG. 8 to the full spacing mode shown in part (c) of FIG. 8, the spacing cam 31 rotates another 90 degrees in the direction of the arrow R4 (the clockwise direction) in the figure, and the spacing slider 30 slides further to the right in the figure (the direction of the arrow K2 in part (c) of FIG. 8). In the full spacing mode, all primary transfer rollers from 5*a* through 5*d* move to an upper position in the figure and are spaced from the inner peripheral surface of the intermediary transfer belt 7, and the spacing roller 19 remains in the upper position in the figure. At this time, the intermediary transfer belt 7 is stretched between the spacing roller 19 and the upstream guide roller 18 (FIG. 1) in the upper position in the figure, and is spaced from all the photosensitive drums from 1*a* through 1*d*. The intermediary transfer unit 20 is set to the full spacing mode, in a case, for example, that the image forming apparatus 200 is waiting for a signal to command a start of an image forming operation (a printing job), in addition to a case that the intermediary transfer belt 7 is under replacement work as will be described below.

5. Configuration for Mounting/Dismounting and Positioning of the Intermediary Transfer Unit Next, a configuration for mounting/dismounting the intermediary transfer unit 20 on/from the main assembly 201 when replacing the intermediary transfer belt 7, etc.

Figure 9:
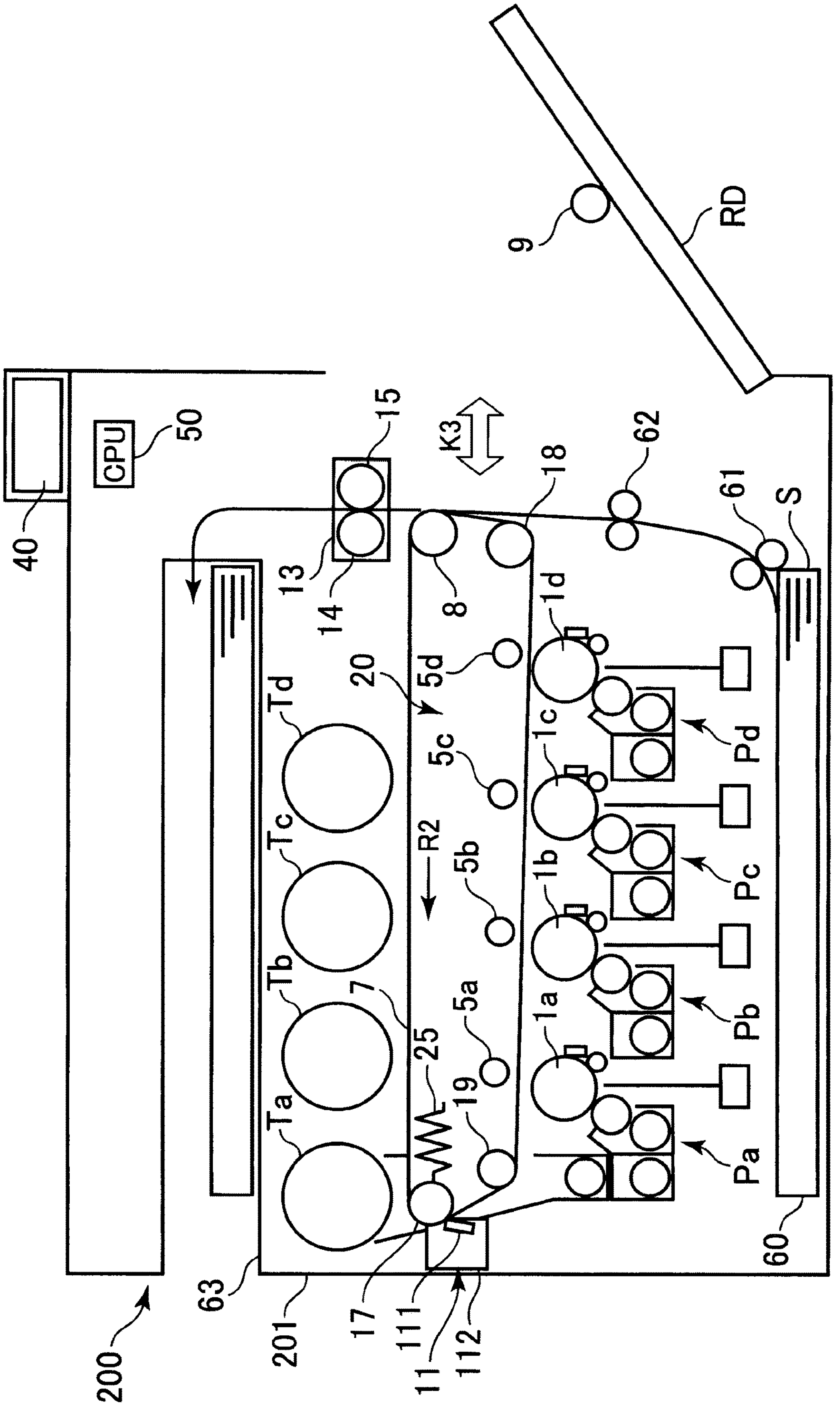
FIG. 9 is a schematic sectional view showing an image forming apparatus when an intermediary transfer unit is mounted and dismounted.

FIG. 9 is a schematic sectional view of the image forming apparatus 200 in this embodiment showing a state that the intermediary transfer unit 20 is being mounted on and dismounted from the main assembly 201. The intermediary transfer unit 20 is dismountable from the main assembly 201 in a state that it is held in the full spacing mode by the spacing mechanism 35. In this embodiment, the intermediary transfer unit 20 is exposed when an operator (a replacement worker) opens a right door RD provided on a right side of the main assembly 201 as seen from the front side. And the intermediary transfer unit 20 is mounted on and dismounted from the main assembly 201 by moving the intermediary transfer unit 20 by the operator in a left-right direction in the figure, that is, in the direction along the tangent plane of the intermediary transfer belt 7 side of a plurality of photosensitive drums from 1*a* through 1*d* as shown by an arrow K3 in FIG. 9. Incidentally, it may be configured to be dismountable from the main assembly apparatus 201 by moving the intermediary transfer unit 20 in a front-back direction in FIG. 9. However, the left-right direction of mounting and dismounting as described above is applied in this embodiment, because in a case of a front-back direction, there are drawbacks in terms of that a positioning accuracy of the intermediary transfer unit 20 with respect to the image forming portions from Pa through Pd is likely to be decreased, and that a configuration is likely to become more complicated due to a need for a housing to cover the intermediary transfer unit 20, etc.

Figure 10:
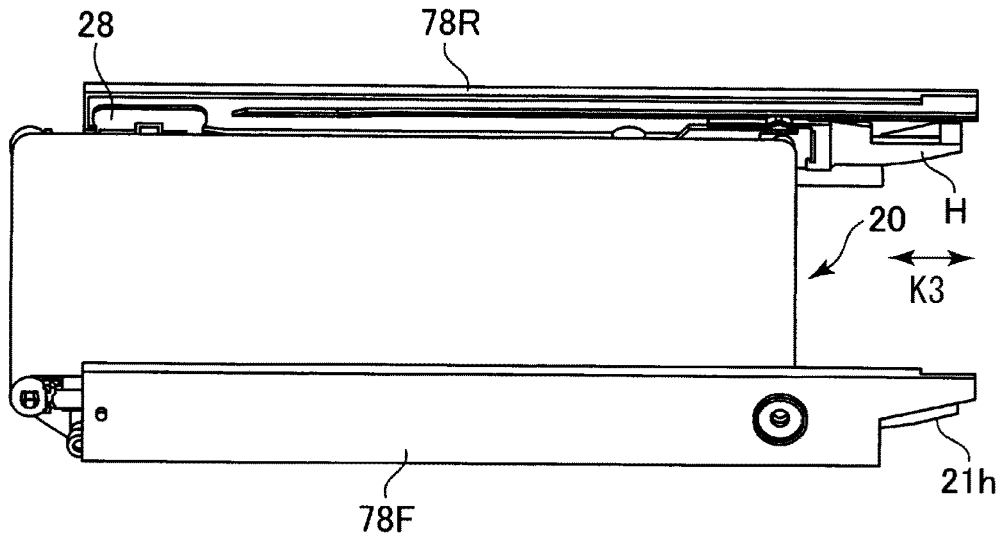
FIG. 10, part(a), part(b) and part(c), is a perspective view to illustrate a mounting and dismounting operation of an intermediary transfer unit.
Figure 10:
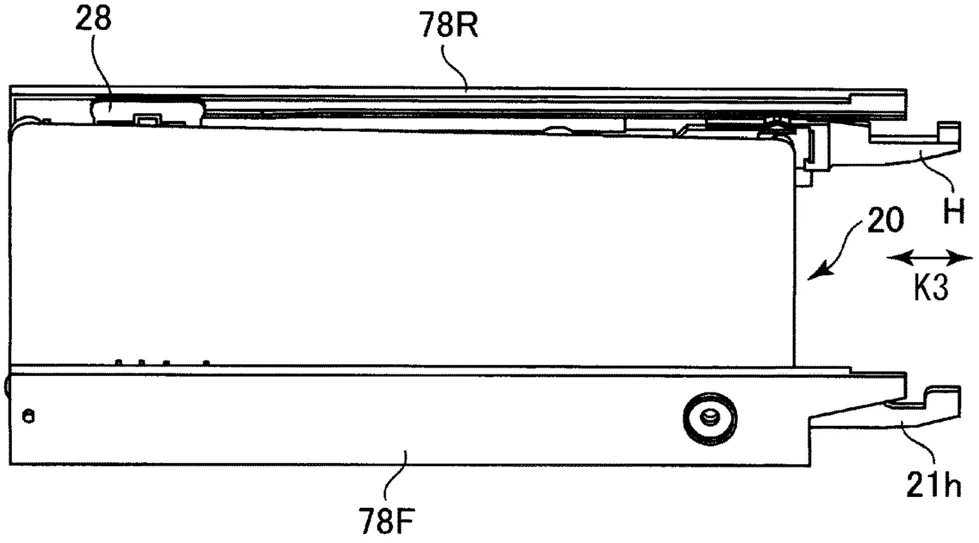
Figure 10:
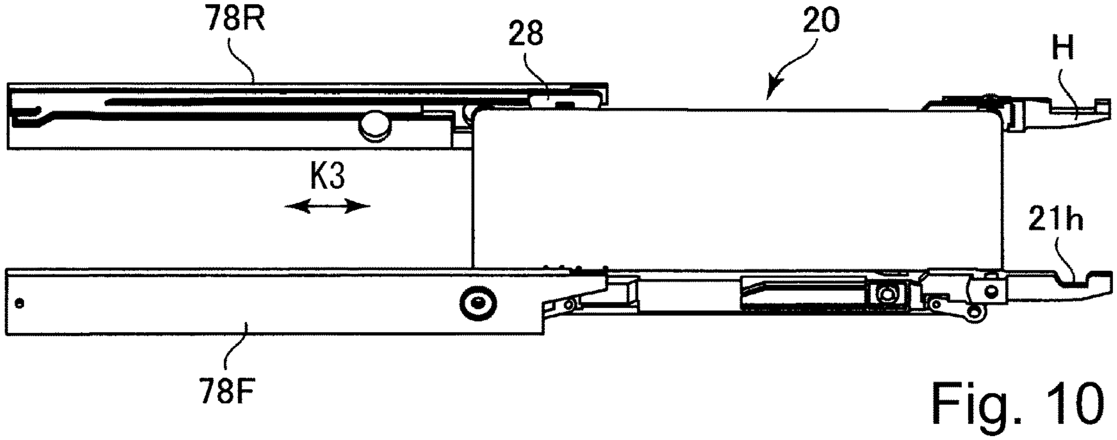
Figure 11:
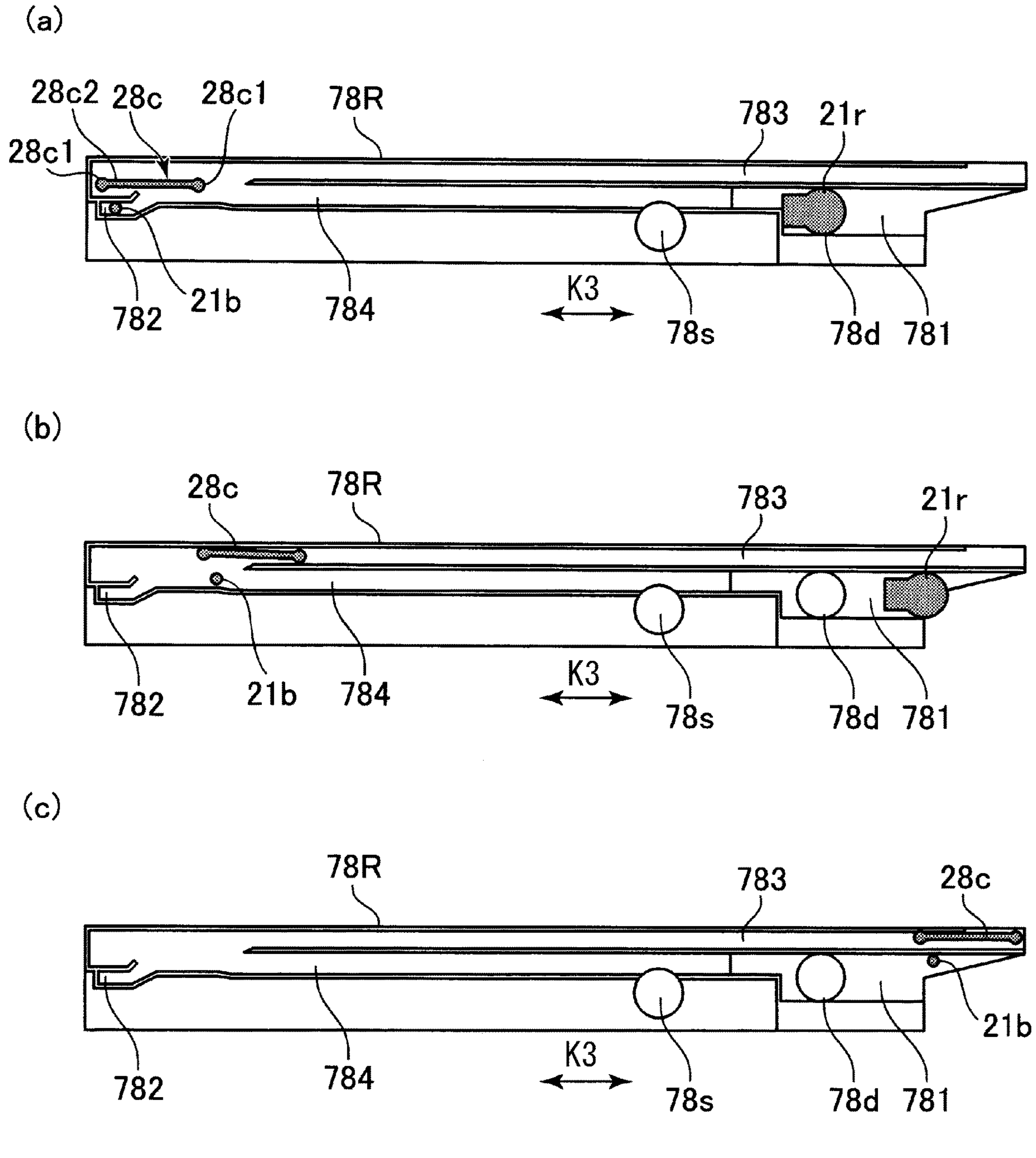
FIG. 11, part(a), part(b) and part(c), is a sectional view to illustrate a mounting and dismounting operation of an intermediary transfer unit.

With reference to FIG. 10 and FIG. 11, an operation of the intermediary transfer unit 20 to mount on and dismount from the main assembly 201 will be further described. FIG. 10, parts (a), (b), and (c) are perspective views showing an operation process of the intermediary transfer unit 20 to mount on and dismount from the main assembly 201. An upper part in FIG. 10, parts (a), (b), and (c) is the rear side of the main assembly 201, and a lower part is the front side of the main assembly 201. Part (a) of FIG. 10 shows a state in which the intermediary transfer unit 20 is mounted on the main assembly 201 (hereinafter also referred to as a "mounted state"). Part (b) of FIG. 10 shows a state in which the intermediary transfer unit 20 is being mounted on the main assembly 201 (hereinafter referred to as a "transition state"). In addition, part (c) of FIG. 10 shows a state in which the intermediary transfer unit 20 is withdrawn from the main assembly 201 and can be removed from the main assembly 201 (hereinafter referred to as a "withdrawn state"). FIG. 11, parts (a), (b), and (c) are sectional views showing an operation process of the intermediary transfer unit 20 to mount on and dismount from the main assembly 201, and sectional views showing the back side of the main assembly 201. Here, FIG. 11, parts (a), (b), and (c) show a state of the intermediary transfer unit 20 corresponding to FIG. 10, parts (a), (b), and (c), respectively.

Transfer rails 78F and 78R as guide members are arranged on an inner surface of the front side and the rear side of the main assembly 201, respectively. The transfer rail 78F on the front side and the transfer rail 78R on the rear side are substantially symmetrical shape with respect to the center of the width direction of the intermediary transfer belt 7, except for some parts with different shapes. The parts described above are a transmission driving hole 78*d* and a spacing driving hole 78*s* as shown in FIG. 11. The transmission driving hole 78*d* is a hole (an opening portion) for a driving transmission from the driving source provided with the main assembly 201 to the driving coupling 34 provided with the intermediary transfer unit 20. In addition, the spacing driving hole 78*s* is a hole (an opening portion) for a driving transmission from the driving source provided with the main assembly 201 to the driving coupling 33 provided with the intermediary transfer unit 20. Connecting members for driving connection protrude from the transmission driving hole 78*d* and the spacing driving hole 78*s*, respectively (not shown). As described above, a configuration of the transfer rail 78R on the rear side will be described as an example, since the transfer rail 78R and 78F on the front side and the rear side are substantially symmetrical shape except for some parts with different shapes described above.

The transfer rail 78R is provided with a guide portion to mount on and dismount from the intermediary transfer unit 20. A first guide portion 781 is configured so that the first positioning portion 21*r* described above provided with the transfer frame 21 is movably fitted. In addition, a second guide portion 782 is configured so that the second positioning portion 21*b* described above provided with the transfer frame 21 is movably fitted. In addition, a third guide portion 783 is configured so that the third positioning portion 28*c* is movably engaged. Incidentally, as described above, the third positioning portion 28*c* on the rear side is provided with the positioning plate 28 attached to the side of the rear side of the transfer frame 21, and the third positioning portion 21*c* on the front side is provided on the side of the front side of the transfer frame 21.

A procedure for removing the intermediary transfer unit 20 from the main assembly 201. In a mounted state (part (a) of FIG. 10 and part (a) of FIG. 11), the first positioning portion 21*r* is fitted with the first guide portion 781 and the second positioning portion 21*b* is fitted with the second guide portion 782. As a result, the intermediary transfer unit 20 is positioned with respect to the image forming portions from Pa through Pd, and it is possible to form an image in the CL mode or the BK mode as described above.

While the intermediary transfer unit 20 is in the full spacing mode, an operator moves the intermediary transfer unit 20 to a right direction in the figure along the direction of the arrow K3 in the figure by holding a frame holding portion 21*h* and a handle member H which are provided with the transfer frame 21. As a result, it become in the transition state (part (b) of FIG. 10, part (b) of FIG. 11). The frame holding portion 21*h* and the handle member H are provided at end portions of each right side in the figure of the front side and the rear side of the transfer frame 21, respectively. In the transition state, the first positioning portion 21*r* is movably fitted with the first guide portion 781, and the third positioning portion 28*c* is movably engaged with the third guide portion 783. As described above, the third positioning portion 28*c* includes two cylindrical portions 28*c*1 and 28*c*1, and a connecting portion (a horizontal portion) 28*c*2 which connects these two cylindrical portions 28*c*1 and 28*c*1.

When the intermediary transfer unit 20 is pulled out slightly from the transition state, the first positioning portion 21*r* is exited from the first guide portion 781 (a fitting relationship is canceled). At this time, when an operator releases a hand from the frame holding portion 21*h* and the handle member H, a weight of the intermediary transfer unit 20 causes a clockwise moment in the figure in the third positioning portion 28*c*. In other words, a side of the frame holding portion 21*h* and the handle member H attempts to descend downward. However, the intermediary transfer unit 20 is held in the transfer rails 78F and 78R, since the third positioning portion 28*c* and the third guide portion 783 are movably engaged. Holding (drop prevention) of the intermediary transfer unit 20 by the transfer rails 78F and 78R continues until the withdrawn state (part (c) of FIG. 10, part (c) of FIG. 11). At this time, the second positioning portion 21*b* passes through the fourth guide portion 784, however, in this embodiment, the second positioning portion 21*b* and the fourth guide portion 784 are configured so that they do not physically contact each other. The intermediary transfer unit 20 become removable from the main assembly 201 after it is moved to the withdrawn state.

Incidentally, a mounting procedure of the intermediary transfer unit 20 onto the main assembly 201 is a reverse order of the removing procedure described above.

6. Mounting and Dismounting of the Intermediary Transfer Belt

Next, a configuration for mounting and dismounting of the intermediary transfer belt 7 on and from the intermediary transfer unit 20 in a case such as replacing the intermediary transfer belt 7 will be described.

6-1. Outline of Replacement Work of the Intermediary Transfer Belt

Figure 12:
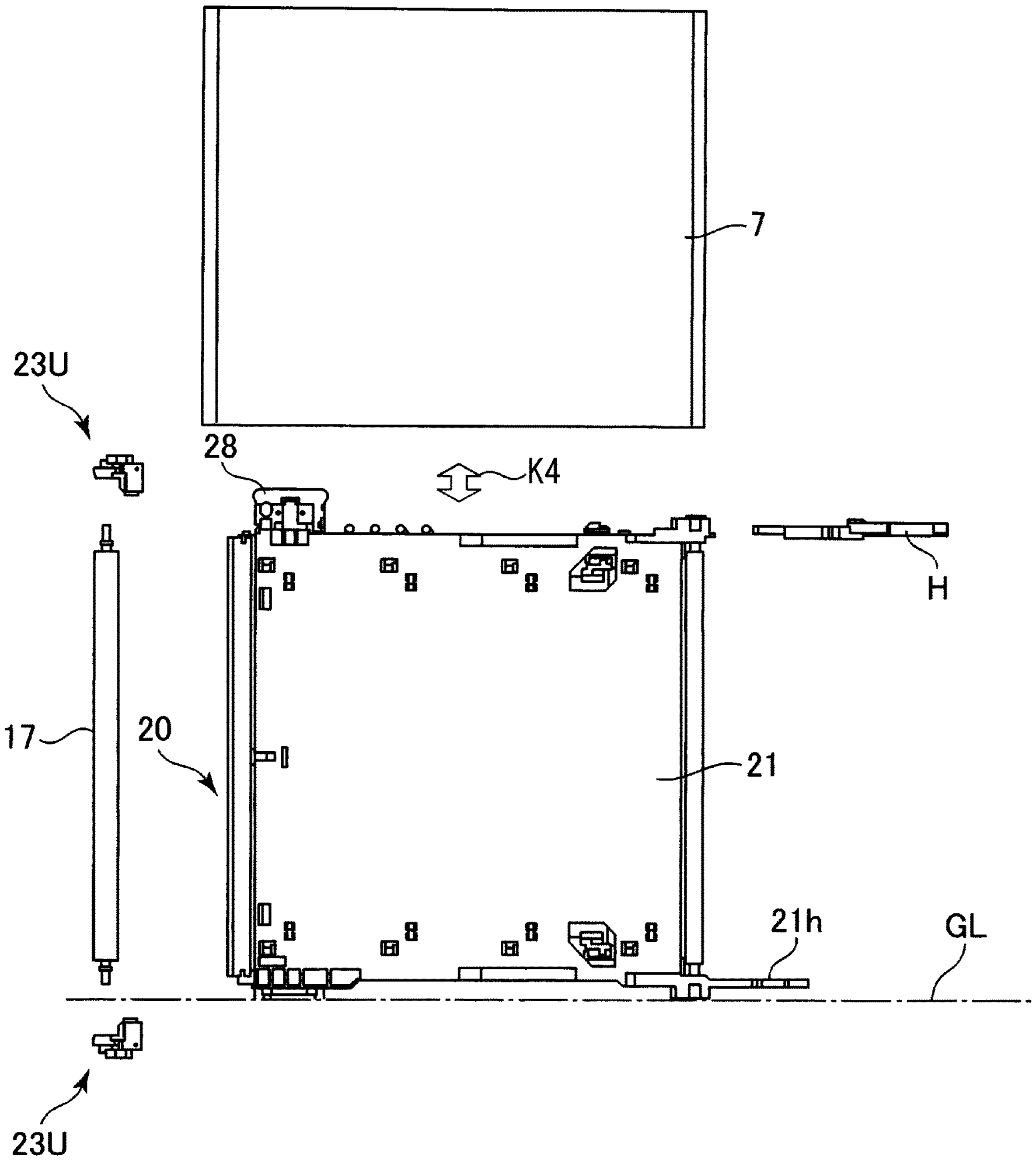
FIG. 12 is a plan view to illustrate a replacement work of an intermediary transfer belt.
Figure 13:
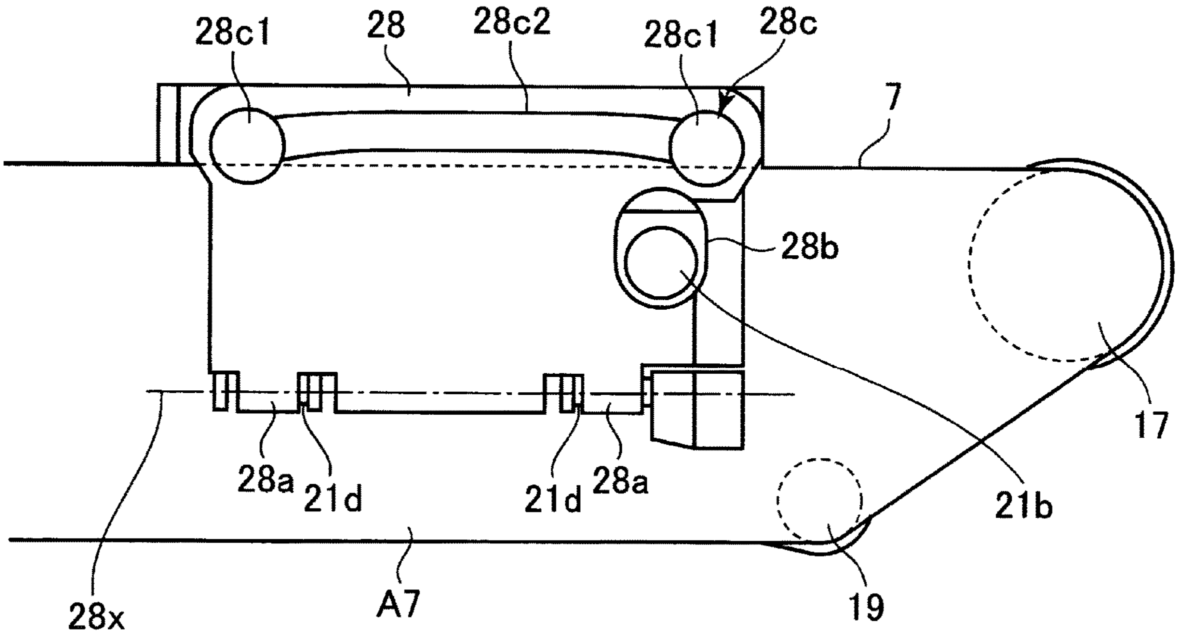
FIG. 13, part(a) and part(b), is a side view to illustrate a positioning plate.
Figure 13:
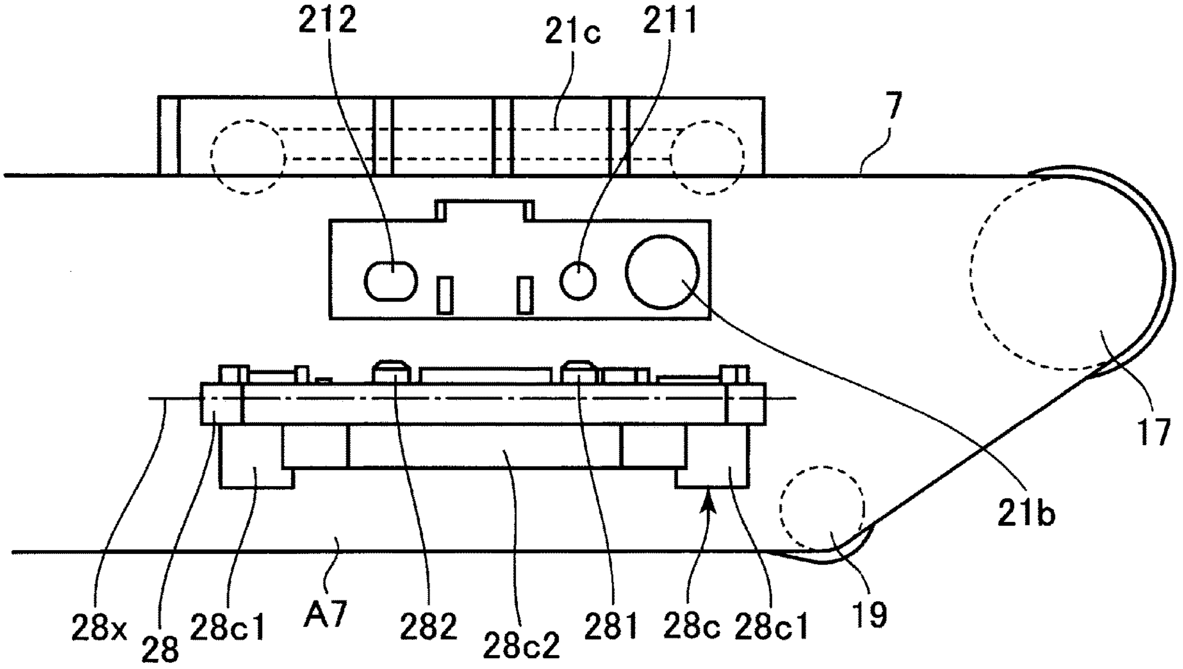

First, an outline of replacement work (mounting and dismounting work) of the intermediary transfer belt 7 will be described. FIG. 12 is an exploded plan view of the intermediary transfer unit 20 from the direction of the arrow TV in FIG. 2 and FIG. 3. FIG. 13 is a schematic side view of the intermediary transfer unit 20 from the rear side in a vicinity of the positioning plate 28. Part (a) of FIG. 13 shows a state that the positioning plate 28 is arranged in a position when the intermediary transfer unit 20 is in use, and part (b) of FIG. 13 shows a state that the positioning plate 28 is arranged in a position when the intermediary transfer belt 7 is being mounted or dismounted.

In this embodiment, in the intermediary transfer unit 20, the handle member H, the dismountable unit 23U, and the steering roller 17 are dismountable from the transfer frame 21, etc., and the positioning plate 28 is movably attached to the transfer frame 21. As will be described in detail below, the dismountable unit 23U includes the slide guide 24, the steering bearing 23, the tension spring 25, and the locking member 22. In a case that the intermediary transfer belt 7 is being mounting on or dismounting from the intermediary transfer unit 20, after the intermediary transfer unit 20 is removed from the main assembly 201, the handle member H, the dismountable unit 23U and the steering roller 17 are removed and the positioning plate 28 is moved. This work is suitable in a case that the intermediary transfer unit 20, which is removed from the main assembly 201, is placed on a worktable GL etc., for example, so that the surface side of the intermediary transfer belt 7 on the front side of the drawing sheet of FIG. 12 is up and the surface is substantially horizontal. Incidentally, a hypothetical line (a single-dotted line) of the worktable GL in FIG. 12 shows a state in which the intermediary transfer unit 20 is placed on worktable GL with the side portion of the front side of the transfer frame 21 down, in a case that the intermediary transfer belt 7 is being mounting and dismounting as will be described below.

The intermediary transfer unit 20, which is removed from the main assembly 201, is place on a worktable GL, for example, as described above, and then the handle member H is removed from the transfer frame 21. The handle member H is removably fixed to the transfer frame 21 by appropriate fixing means such as tightening tools like screws, snap-fit engagements, etc. An operator removes the handle member H by a procedure according to the fixing means. In addition, the dismountable unit 23U is removed from the swingable plate 26 and the steering roller 17. A configuration of the dismountable unit 23U will be described in detail below. When the dismountable unit 23U is removed, it is possible to remove the steering roller 17. Then, the steering roller 17 is removed by pulling it out from an inner peripheral side of the intermediary transfer belt 7. In addition, the positioning plate 28 is moved. When the positioning plate 28 is moved, it is possible to remove the intermediary transfer belt 7.

Incidentally, as will be described in detail below, when the dismountable unit 23U is removed, a tension applied to the intermediary transfer belt 7 by the tension spring 25 is released (blocked) by a function of the dismountable unit 23U. Incidentally, as will be described below, when the intermediary transfer belt 7 is being mounted or dismounted, only one of the dismountable units 23U (the rear side in this embodiment) among the dismountable units 23U on both sides in the direction of the rotational axis of the steering roller 17 may be removed. In addition, for example, by removing one of the dismountable units 23U, the intermediary transfer belt 7 may be removed without removing the steering roller 17.

Here, a configuration of the positioning plate 28 will be further described with reference to FIG. 13. Part (a) of FIG. 13 shows a vicinity of the positioning plate 28 of the intermediary transfer unit 20 in a state in which the positioning plate 28 is not moved after removed from the main assembly 201 (including the "withdrawn state" described above). In addition, part (b) of FIG. 13 shows a vicinity of the positioning plate 28 of the intermediary transfer unit 20 in which the positioning plate 28 is moved and the intermediary transfer belt 7 is standing by in a replaceable state.

As shown in FIG. 13, part (a) and part (b), in this embodiment, the positioning plate 28 is rotatably attached to the transfer frame 21, so that it rotates approximately 90 degrees to a front side of the figure (the rear side), centering on a rotational axis 28*x*. In this embodiment, the positioning plate 28 is configured so that a hinge portion 28*a* provided at a lower end in the figure of the positioning plate 28 is rotatably fitted to a rotational support axis 21*d* provided at the rear side of the transfer frame 21, in which an upper part in the figure is rotated downward. Incidentally, in this embodiment, the positioning plate 28 is provided with a second positioning hole 28*b*, which is an opening portion to expose the second positioning portion 21*b* provided on the rear side of the transfer frame 21 to an outside of the positioning plate 28 in a state shown in part (a) of FIG. 13. Here, as shown in FIG. 13, part (a) and part (b), as the intermediary transfer unit 20 in a state in which an intermediary transfer belt 7 is stretched over a plurality of stretching rollers (in this embodiment, a state in the "full spacing mode" described above) is viewed along the width direction of the intermediary transfer belt 7 (in a direction of the rotational axis of the stretching rollers), an area surrounded by the outer peripheral surface of the intermediary transfer belt 7 is defined as a "belt area (a belt projection plane) A7".

In the state shown in part (a) of FIG. 13, the positioning plate 28 and a part of the third positioning portion 28*c* which is provided with the positioning plate 28 are positioned so as to extend over inner and outer sides of the belt area A7 (a first state). In this case, even if trying to move the intermediary transfer belt 7 in a direction of an arrow K4 in FIG. 12, that is, along the width direction of the intermediary transfer belt 7 (in the direction of the rotational axis of the stretching rollers), the intermediary transfer belt 7 and the positioning plate 28 interfere with each other in a movement locus. Thus, it is impossible to remove the intermediary transfer belt 7. For this reason, in this embodiment, the positioning plate 28 is designed to be movable (rotatable) as described above. From a state of part (a) of FIG. 13 is switched to a state of part (b) FIG. 13 by rotating the positioning plate 28 around the rotational axis 28*x* approximately 90 degrees to the front side in the figure. In the state of part (b) of FIG. 13, all of the positioning plate 28 and the third positioning portion 28*c* provided with the positioning plate 28 are positioned inside the belt area A7 (a second state). Thereby, it is possible to move the intermediary transfer belt 7 along the direction of the arrow K4 in FIG. 12. Incidentally, when the positioning plate 28 is closed, it is held in a closed state (the first state) by engaging protrusions 281 and 282 provided with an inside of the positioning plate 28, which are fitted with engagement holes 211 and 212 provided with the transfer frame 21, respectively.

After removing the handle member H, the dismountable unit 23U and the steering roller 17 and moving the positioning plate 28 as described above, the side of the front side of the transfer frame 21 is grounded on the worktable GL and the intermediary transfer unit 20 is stood on the worktable GL, as shown in FIG. 12. That is, the intermediary transfer unit 20 is placed on the worktable GL so that the frame holding portion 21*h* provided with the transfer frame 21 is located in a lower position. Then, the intermediary transfer belt 7 is moved upward in the figure along the direction of the arrow K4 and removed from a periphery of the transfer frame 21. Incidentally, the intermediary transfer unit 20 may be configured to stand on its own, or, for example, an operator may hold the transfer frame 21 with one hand while mounting and dismounting the intermediary transfer belt 7 with the other hand.

After that, for example, a new intermediary transfer belt 7 is moved downward in the figure along the direction of the arrow K4 in the figure and mounted around the transfer frame 21. After that, it is possible to assemble the intermediary transfer unit 20 in a reverse procedure of the removal procedure described above. In addition, after that, it is possible to mount the intermediary transfer unit 20 on the main assembly 201 in a manner described above.

6-2. Dismountable Unit

Figure 14:
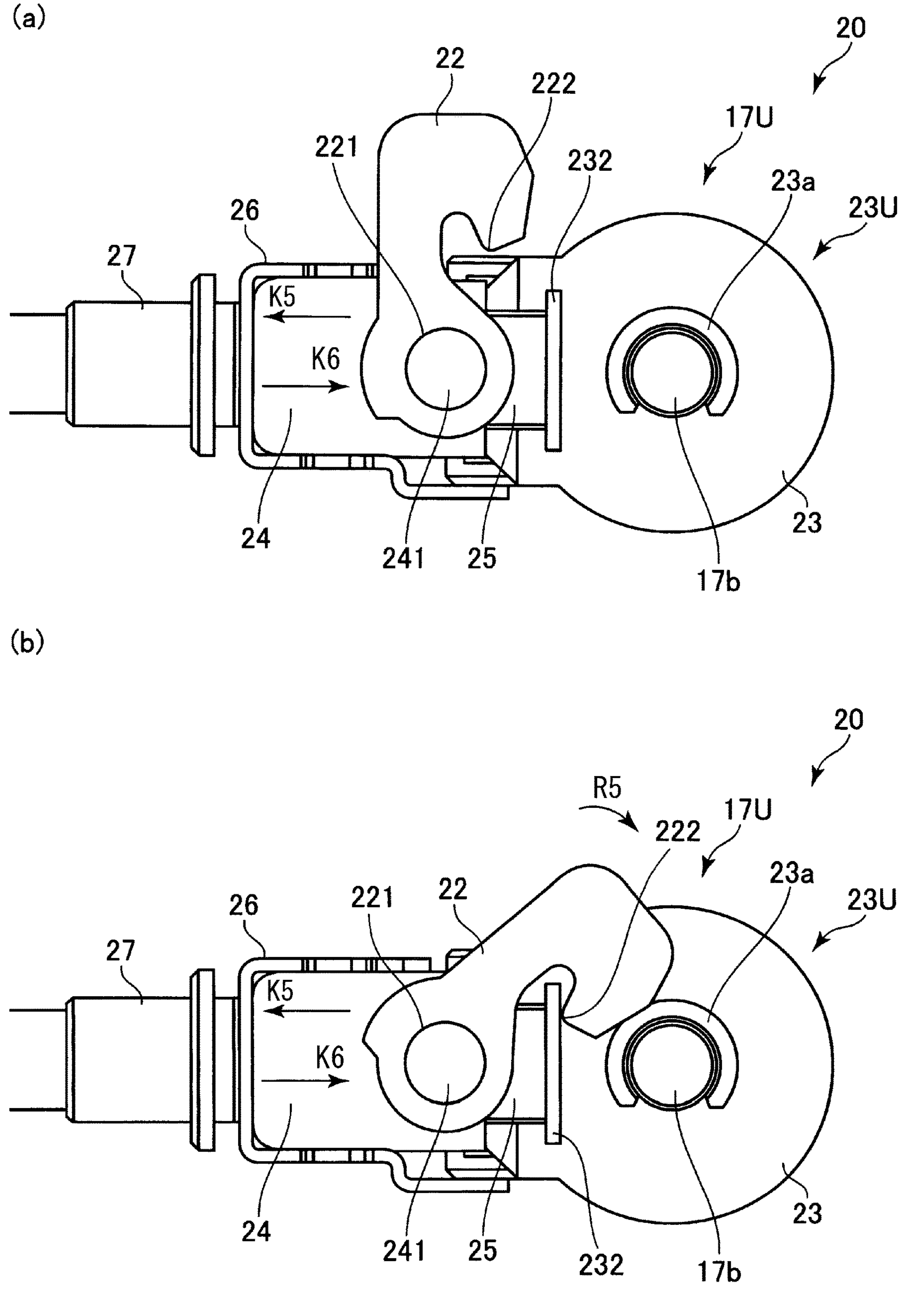
FIG. 14, part(a) and part(b) is a side view showing a dismountable unit.
Figure 15:
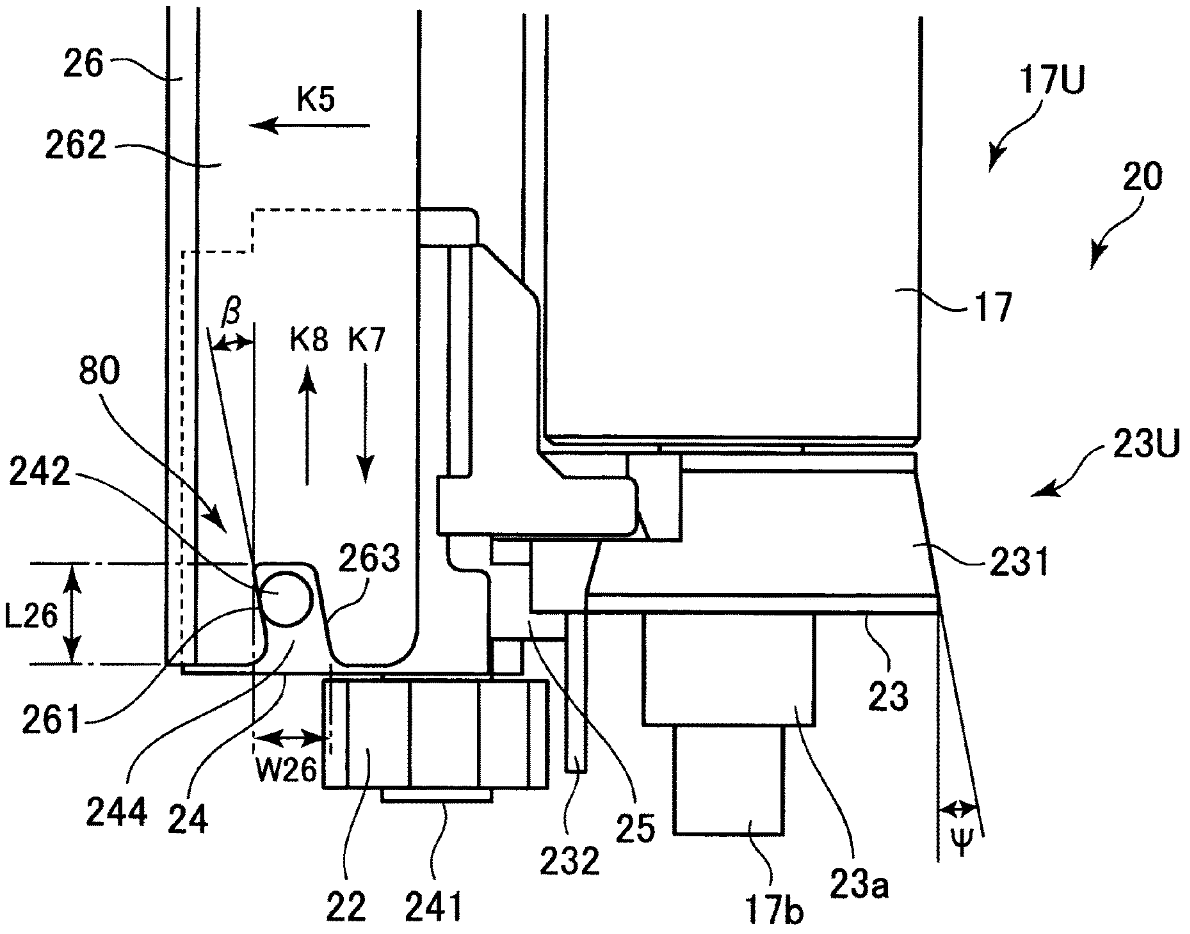
FIG. 15 is a plan view showing a dismountable unit in an unlocked state.
Figure 16:
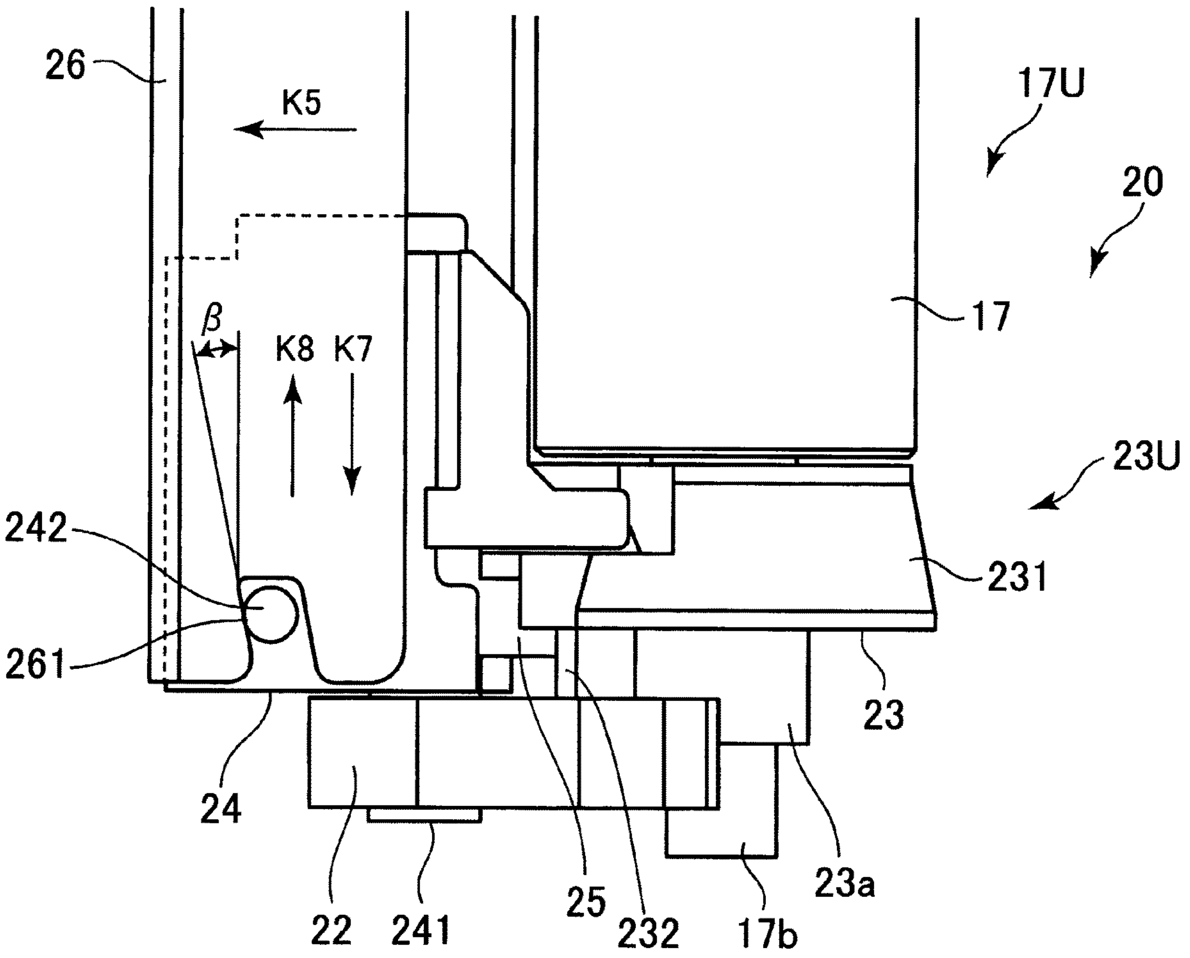
FIG. 16 is a plan view showing a dismountable unit in a locked state.
Figure 17:
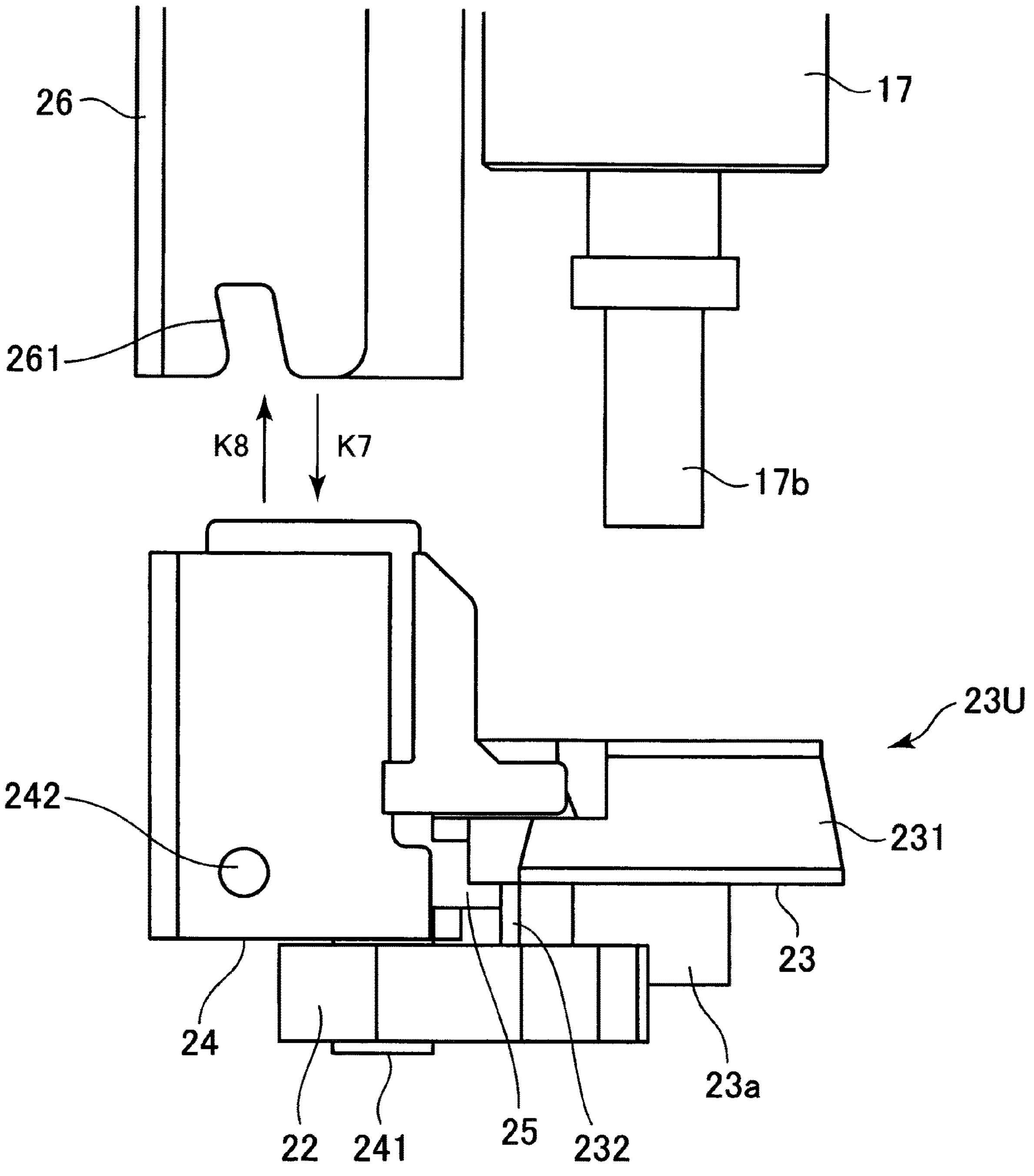
FIG. 17 is a plan view showing a dismountable unit removed from an intermediary transfer unit.

Next, the dismountable unit 23U as a mounting and dismounting mechanism in this embodiment will be explained. FIG. 14 is a side view of the self-alignment mechanism 17U in this embodiment shown in FIG. 4 and FIG. 5, viewed from the rear side along the direction of the rotational axis of the steering roller 17. Part (a) of FIG. 14 shows a same state as in FIG. 4 and FIG. 5. That is, part (a) of FIG. 14 shows a state in which tension is applied to the intermediary transfer belt 7 by the urging force of the tension spring 25 (the first state, the unlocked state). On the other hand, part (b) of FIG. 14 shows a state (a second state, a locked state) in which tension applied to the intermediary transfer belt 7 by the tension spring 25 is released (blocked) by a function of the dismountable unit 23U, as described in detail below. In addition, FIG. 15, FIG. 16 and FIG. 17 are plan views (top views) of a vicinity of the end portion of the rear side of the self-alignment mechanism 17U in the embodiment shown in FIG. 4 and FIG. 5, viewed from the direction of the arrow TV in FIG. 2 and FIG. 3. FIG. 15 shows a same state as part (a) of FIG. 14. In addition, FIG. 16 shows a same state as part (b) of FIG. 14. In addition, FIG. 17 shows a state in which the dismountable unit 23U is removed from the swingable plate 26 and the steering roller 17. Incidentally, FIGS. 14 to 17 show a configuration of the dismountable unit 23U on one end portion side (the rear side) in the direction of the rotational axis of the steering roller 17 (in the width direction of the intermediary transfer belt 7). Here, this one end portion side is described as an example, however, in this embodiment, the configuration of the dismountable unit 23U on the other end portion side is also similar (substantially symmetrical with respect to the center of the width direction of the intermediary transfer belt 7) and has substantially same functions. In FIGS. 14 to 16, illustrations of the intermediary transfer belt 7 are omitted.

As shown in FIG. 14, parts (a) and (b) (see also FIG. 4 and FIG. 5), the swingable plate 26 has a substantially U-shaped section open to the steering roller 17 side, which is substantially perpendicular to its longitudinal direction (parallel to the direction of the rotational axis of the steering roller 17). The dismountable unit 23U is attached to the swingable plate 26 by having the slide guide 24 fitted inside the substantially U-shaped section described above at the end portions in the longitudinal direction of the swingable plate 26 in such a way that it is possible to slide from outside to inside along the longitudinal direction of the swingable plate 26 (see FIG. 17). In addition, when the slide guide 24 is attached to the swingable plate 26 as described above, a roller shaft 17*b* of the steering roller 17 is inserted into a support portion 23*a* of the steering bearing 23, so that the steering roller 17 is supported by the steering bearing 23.

As shown in part (a) of FIG. 14, the dismountable unit 23U is configured including the steering bearing 23, the slide guide 24, the tension spring 25, and the locking member 22. The steering bearing 23, the slide guide 24, and the tension spring 25 have configurations and functions as described above, respectively, and the tension spring 25 is disposed in a compressed state between the steering bearing 23 and the slide guide 24. A movement of the slide guide 24 in an up-down direction in the figure, that is, in a direction intersecting with (in the embodiment, substantially perpendicular to) an urging direction of the tension spring 25 against the intermediary transfer belt 7 (a direction of an arrow K6 in the figure), is restricted by fitting with the swingable plate 26. And in the state shown in part (a) of FIG. 14 (the first state, the unlocked state), the slide guide 24 moves in the direction of the arrow K5 in the figure, that is, in a direction opposite to the urging direction of the tension spring 25 against the intermediary transfer belt 7 (the direction of the arrow K6 in the figure), and contacts (abuts) with the swingable plate 26. That is, an urging force of the tension spring 25 in the direction of the arrow K5 in the figure is received by the swingable plate 26 via the slide guide 24. In addition, the urging force in the direction of arrow K6 in the figure is received by the intermediary transfer belt 7 via the steering roller 17, and becomes a tension of the intermediary transfer belt 7.

And as shown in part (a) of FIG. 14, the locking member 22 is attached to the slide guide 24. In this embodiment, the slide guide 24 is provided with a cylindrical shaft portion 241 as a locking member support portion, which extends outward in substantially parallel with the direction of the rotational axis of the steering roller 17. A hole portion 221 as a support receive portion provided with the locking member 22 is fitted into this shaft portion 241. As a result, the locking member 22 is mounted on the slide member 24 so that it is possible to rotate around a rotational axis which is substantially parallel to the direction of the rotational axis of the steering roller 17. In addition, the locking member 22 is provided with a hook portion 222 as an engagement portion. This hook portion 222 is configured to engage a protrusion portion 232 as an engaged portion extending outward in the direction of the rotational axis of the steering roller 17, which is provided with the steering bearing 23.

As shown in part (b) of FIG. 14, the locking member 22 is rotated in a direction of an arrow R5 (a clockwise direction) in the figure, and the hook part 222 engages the protrusion portion 232. In this state, the steering bearing 23 remains fitted in the engaging groove 243 of the slide guide 24, and the tension spring 25 remains disposed between the slide guide 24 and the steering bearing 23 in the engaging groove 243. In the state shown in part (b) of FIG. 14 (the second state, the locked state), the urging force of the tension spring 25 in the direction of the arrow K5 in the figure is received by the slide guide 24 and the locking member 22. In addition, the urging force in the direction of the arrow K6 in the figure is received by the steering bearing 23 and the locking member 22. As a result, the urging force of the tension spring 25 is closed inside the dismountable unit 23U, and the urging force applied by the tension spring 25 to the swingable plate 26 and the intermediary transfer belt 7 is released (blocked). The locking member 22 configures a tension release means to release a tension applied to the intermediary transfer belt 7 by the tension spring 25. Incidentally, in this embodiment, the locking member 22 engages the protrusion portion 232 in a state in which the steering bearing 23 is moved slightly in the direction of the arrow K5 in the figure so as to compress the tension spring 25 from the state shown in part (a) of FIG. 14, and becomes in the state shown in part (b) of FIG. 14. By an operation of engaging the locking member 22 with the projection 232, the steering bearing 23 may be moved slightly in the direction of the arrow K5 in the figure so as to compress the tension spring 25.

A position, where an engagement of the hook portion 22 with the protrusion portion 232 is released and the dismountable unit 23U (the intermediary transfer unit 20) is the unlocked state (the first state) of part (a) of FIG. 14 in the direction of the movement (the direction of the rotation) of the locking member 22, is defined as an unlocked position (a first position). In addition, a position, where the hook portion 22 engages the protrusion portion 232 and the dismountable unit 23U (the intermediary transfer unit 20) is the locked state (the second state) in part (b) of FIG. 14 in the direction of the movement (the direction of the rotation) of the locking member 22, is defined as a locked position (a second position). In this way, by moving (rotating) the locking member 222 from the unlocked position (the first position) in part (a) of FIG. 14 to the locked position (the second position) in part (b) of FIG. 14, the tension applied to the intermediary transfer belt 7 by the tension spring 25 is released (blocked). Thus, it is possible to easily remove the dismountable unit 23U from the swingable plate 26 and the steering roller 17 by moving it outward along the direction of the rotational axis of the steering roller 17, as will be described in detail later. At this time, the slide guide 24 is moved to slide outward along the longitudinal direction of the swingable plate 26. In addition, at this time, the steering bearing 23 is moved to slide outward along the direction of the rotational axis of the steering roller 17 so that the support portion 23*a* is pulled out from the roller shaft 17*b* of the steering roller 17. And the entire dismountable unit 23U, including the slide guide 24, the steering bearing 23, the tension spring 25, and the locking member 22, is integrally removed from the swingable plate 26 and the steering roller 17 (see FIG. 17). Even when the dismountable unit 23U is removed from the intermediary transfer unit 20, the locking member 22 keeps holding the steering bearing 23 in the slide guide 24 against the urging force of the tension spring 25. When the dismountable unit 23U is removed, it is possible to easily remove the steering roller 17 so as to pull it out from an inside of the intermediary transfer belt 7 by moving the steering roller 17 along the direction of its rotational axis. In addition, after moving the positioning plate 28 as described above, it is possible to easily remove the intermediary transfer belt 7 by moving it in the width direction and pulling it out from a periphery of the transfer frame 21.

With reference to FIGS. 15 through 17, mounting and dismounting, and positioning of the dismountable unit 23U will be further described. As described above, FIG. 15 shows the same state as part (a) of FIG. 14 (the first state, the unlocked state). In addition, FIG. 16 shows the same state as part (b) of FIG. 14 (the second state, the locked state). In addition, FIG. 17 shows a state in which the dismountable unit 23U is removed from the swingable plate 26 and the steering roller 17.

The slide guide 24 is provided with a cylindrical restricting protrusion portion 242 as a restricting receive portion on a slide guide upper surface 244 which is a side surface shown in FIGS. 15 through 17, protruding toward a front side of the drawing sheet of FIGS. 15 through 17. In addition, the swingable plate 26 is provided with a restricting groove portion 263 on a swingable plate upper side portion 262 which is a side portion opposing the slide guide upper surface 244, formed by being cut out to extend in a straight line inwardly from the end portion in the longitudinal direction of the swingable plate 26. As will be described below, the side portion of the restricting groove portion 263 which is an opposite side of the steering roller 17 with respect to a direction substantially perpendicular to the longitudinal direction of the swingable plate 26 (along the direction of the arrow K5 in the figure) configures a restricting slope 261 as a restricting portion which engages the restricting protrusion portion 242. The slide guide 24 is attached to the swingable plate 26, so that the restricting protrusion portion 242 is moved from an opening portion of the regulation groove 263 at the end portion in the longitudinal direction of the swingable plate 26, through the restricting groove portion 263 from an outside to an inside in the longitudinal direction of the swingable plate 26. In addition, the slide guide 24 is removed from the swingable plate 26 by being moved in an opposite direction to the direction described above. As will be described below, in this embodiment, an extending direction of the restricting groove portion 263 is inclined (inclined angle β) with respect to the longitudinal direction of the swingable plate 26. In this embodiment, the restricting slope 261 as the restricting portion and the restricting protrusion portion 242 as the restricting receive portion configure a restricting means 80 which is capable of restricting a movement of the slide guide 24 (the dismountable unit 23U) in a direction along the direction of the rotational axis of the steering roller 17.

Here, a width between a furthest position and a closest position to the steering roller 17 in a side portion of the restricting groove portion 263 with respect to a direction which is substantially perpendicular to the longitudinal direction of the swingable plate 26 (a direction along the arrow K5 in the figure) is defined as a width W26. At this time, the width W26 is set to have a predetermined clearance with respect to the restricting protrusion portion 242 so that the slide guide 24 is allowed to mount on and dismount from the swingable plate 26 by moving it along the longitudinal direction of the swingable plate 26. A length L26 of the restricting groove portion 263 with respect to the longitudinal direction of the swingable plate 26 as will be described below.

In the state of FIG. 15, the restricting protrusion portion 242 is in contact with the restricting slope 261 of the restricting groove portion 263. In this embodiment, a taper angle ψ is provided on the sliding surface 231 of the steering bearing 23. In this embodiment, the sliding surface 231 is linearly inclined so that when viewed in a direction substantially perpendicular to the direction of the rotational axis of the steering roller 17, as it goes from inside to outside of the direction of the rotational axis, it is located at more downstream side of an urging direction in which the tension spring 25 is applied to the steering bearing 23. Thus, when the intermediary transfer belt 7 is stretched in a state shown in FIG. 15, a component force of the urging force from the tension spring 25 acts on the sliding surface 231 of the steering bearing 23 in the direction of the arrow K7 in the figure. The direction of the arrow K7 in the figure is a direction toward the outside of the swingable plate 26 along the longitudinal direction of the swingable plate 26 (the direction of the rotational axis of the steering roller 17). In addition, since the slide guide 24 is configured to engage with the steering bearing 23 and guide it so that it is possible to slide and move, as a result, the slide guide 24 is also subjected to the component force of the urging force from the tension spring 25 (also referred to here as a "separation force") in the direction of the arrow K7 in the figure.

On the other hand, in this embodiment, an inclined angle β is provided on the restricting slope 261. Incidentally, this inclined angle β is an angle between the longitudinal direction of the swingable plate 26 (the direction of the rotational axis of the steering roller 17) and the restricting slope 261, when viewed in a direction substantially perpendicular to the longitudinal direction of the swingable plate 26 (the direction of the rotational axis of the steering roller 17). In this embodiment, the restricting slope 261 is linearly inclined so that when viewed in a direction substantially perpendicular to the longitudinal direction of the swingable plate 26, as it goes from outside to inside of the longitudinal direction, it is located at more downstream side of an urging direction in which the tension spring 25 is applied to the slide guide 24. Thus, in the state shown in FIG. 15, when the slide guide 24 is not in contact with the swingable plate 26 in the direction of the arrow K5 in the figure, the restricting protrusion portion 242 is subjected to a component force of the urging force from the tension spring 25 in the direction of the arrow K8 in the figure (also referred to here as an "prevention force"). The direction of the arrow K8 in the figure is a direction toward the inside of the swingable plate 26 along the longitudinal direction of the swingable plate 26. That is, in this embodiment, when the intermediary transfer belt 7 is stretched in the state shown in FIG. 15, the restricting protrusion portion 242 is configured to be located at a predetermined position (in a middle of an inclined surface) between end portions of the inclined surface 261 with respect to an extension direction of the restricting groove portion 263. In other words, the length L26 of the restricting groove portion 263 with respect to the longitudinal direction of the swingable plate 26 is set so that the restricting protrusion portion 242 is positioned at a predetermined position in the middle of the inclined surface described above of the restricting slope 261 when the intermediary transfer belt 7 is stretched in the state shown in FIG. 15. As a result, a positioning accuracy of the dismountable unit 23U (the slide guide 24, the steering bearing 23, etc.) with respect to the swingable plate 26 and the steering roller 17 is improved.

Incidentally, the separation force and the prevention force described above are determined by the urging force of the tension spring 25, the taper angle ψ of the steering bearing 23 and the inclined angle β of the swingable plate 26, and friction coefficients of the components, etc. However, basically, it is possible to restrict a movement of the slide guide 24 in the direction of arrows K7 and K8 in the figure in a case that the configuration is satisfied with the inclined angle β>taper angle ψ (that is, the inclined angle β is greater than the taper angle ψ). Even when the steering bearing 23 is not provided with a tapered surface (ψ=0 degrees), by providing the inclined angle β to the restricting slope 261, it is possible to restrict a movement of the dismountable unit 23U toward the outside in the longitudinal direction of a swingable shaft 26 while a tension is applied to the intermediary transfer belt 7. Incidentally, although it is not limited to this, the inclined angle β of 45 degrees or less is often sufficient, and is typically 30 degrees or less. In this embodiment, the taper angle ψ is 10 degrees, while the inclined angle β is 15 degrees.

In a state of FIG. 16, as described above, since the urging force of the tension spring 25 is closed inside the dismountable unit 23U, the slide guide 24 does not urge the swingable plate 26. That is, the prevention force described above does not act, and as a result, the dismountable unit 23U is capable of mounting on and dismounting from the swingable plate 26 and the steering roller 17 by moving in the direction of the arrows K7 and K8 in the figure.

As shown in FIG. 17, the dismountable unit 23U is dismountable from the swingable plate 26 and the steering roller 17 by moving in the direction of the arrows K7 and K8 in the figure. In a case of mounting and dismounting of the intermediary transfer belt 7, the locking member 22 of the dismountable unit 23U is disposed in the locked position (the second position), the steering roller 17 is removed after removing the dismountable unit 23U, and the intermediary transfer belt 7 is removed. Then, after attaching the steering roller 17 and attaching the intermediary transfer belt 7, the dismountable unit 23U is attached, and the locking member 22 of the dismountable unit 23U is disposed in the unlocked position (the first position).

So far, a configuration of one end portion side in the longitudinal direction of the swingable plate 26 with respect to mounting and dismounting the dismountable unit 23U is described as an example. As described above, in this embodiment, the dismountable units 23U on both end portion sides in the longitudinal direction of the swingable plate 26 have substantially the same functions by substantially symmetrically arranging the same members. However, in a case of mounting and dismounting of the intermediary transfer belt 7, only one dismountable unit 23U (the rear side in this embodiment) among the dismountable units 23U on both end portion sides in the direction of the rotational axis of the steering roller 17 may be dismounted. In addition, for example, the intermediary transfer belt 7 may be removed without removing the steering roller 17 by removing one of the dismountable units 23U. Furthermore, it may be designed that a bearing configuration of only one side (for example, the rear side) is configured with a dismountable unit 23U which is similar to this embodiment. In that case, the other bearing configuration may not be easily dismountable.

6-3. Prevention of Forgetting to Unlock the Lock

Figure 18:
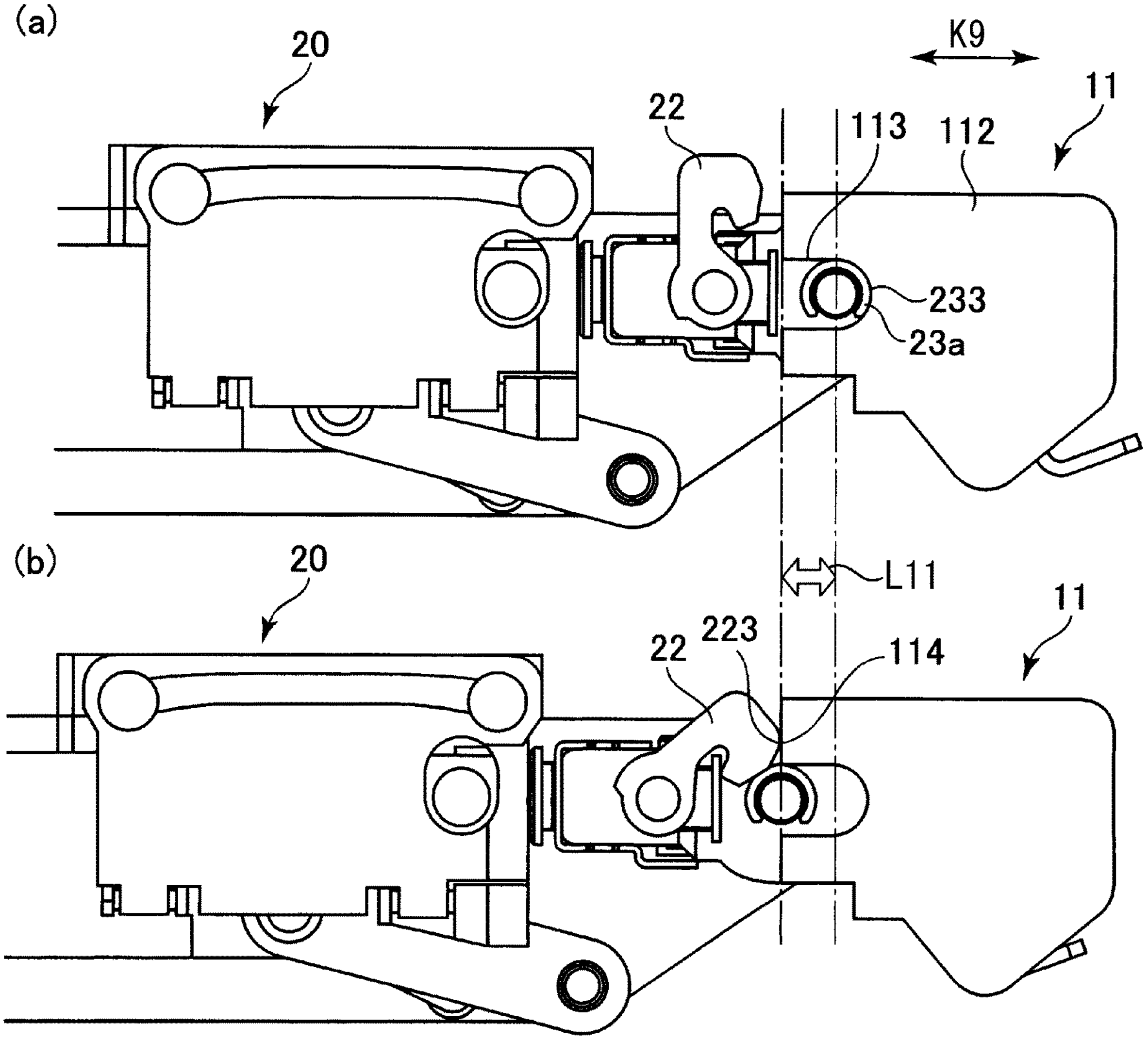
FIG. 18, part(a) and part(b), is a side view to illustrate an unlocking forgetting prevention function.

Next, referring to FIG. 18, we will explain the lock release prevention configuration of the locking member 22 in this example. FIG. 18 is a side view of the vicinity of the detachable unit 23U of the intermediary transfer unit 20 from the rear side. Part (a) of FIG. 18 shows a state (the first state described above and an installation state with respect to the main assembly 201) in which the locking member 22 is disposed in the unlocked position (the first position). In addition, part (b) of FIG. 18 shows a state in which the locking member 22 is disposed in the locked position (the second position) (the second state described above and an installation state with respect to the main assembly 201).

As described above, the locking member 22 which configures the dismountable unit 23U has a function of blocking (releasing) an urging force (a tension) against the intermediary transfer belt 7. However, if, hypothetically, the intermediary transfer unit 20 is operated while this urging force is released, malfunctions may occur, for example, such that driving force does not properly transmit to the intermediary transfer belt 7 and the intermediary transfer belt 7 is not properly fed. Thus, in this embodiment, the intermediary transfer unit 20 (the dismountable unit 23U) is provided with a function to prevent from forgetting to unlock the locking member 22.

For simplicity, a detailed description is omitted above, in this embodiment, the intermediary transfer unit 20 is mounted on and dismounted from the main assembly 201, while the belt cleaning device 11 is mounted on the transfer frame 21. As described above, the belt cleaning device 11 is mounted in a position opposing the steering roller 17 via the intermediary transfer belt 7. In a case that removing the intermediary transfer belt 7 from the transfer frame 21, such as replacing the intermediary transfer belt 7, the belt cleaning device 11 is removed before removing the dismountable unit 23U as described above. In addition, for example, a new intermediary transfer belt 7 is mounted, and the belt cleaning device 11 is mounted after attaching the dismountable unit 23U as described above. The belt cleaning device 11 is positioned with respect to the steering roller 17 and fixed to the transfer unit 20 so that it swings integrally with the swinging of the steering roller 11.

As shown in part (a) of FIG. 18, in this embodiment, the cleaning container 112 of the belt cleaning device 11 has a positioning groove 113 as a positioned portion for positioning the belt cleaning device 11 with respect to the steering roller 17. In addition, in this embodiment, an outer peripheral surface of the support portion 23*a* of the steering bearing 23 which configures the dismountable unit 23U, configures a positioning surface 233 as a positioning portion. The belt cleaning device 11 is positioned with respect to the steering roller 17 by moving it along a direction which is substantially perpendicular to the direction of the rotational axis of the steering roller 17 (a direction of an arrow K9 in the figure) and fitting the positioning groove 113 into the positioning surface 233. Incidentally, in FIGS. 18, (a) and 18(*b*), only a configuration of one end portion side in the rotational axis direction of the steering roller 17 is shown, however, a configuration of the other end side is similar (substantially symmetrical with respect to the center of the width direction of the intermediary transfer belt 7).

As shown in part (a) of FIG. 18, in a state that the locking member 22 is disposed in the unlocked position (the first position), the positioning groove 113 and the positioning surface 233 are properly fitted, and the belt cleaning device 11 is properly positioned with respect to the steering roller 17. That is, the locking member 22, when it is in the unlocked position (the first position), allows the belt cleaning device 11 to be mounted in a predetermined position during normal use. Thus, the belt cleaning device 11 is, in normal cases, mounted on the intermediary transfer unit 20 after the locking member 22 is disposed in the unlocked position (the first position) and the dismountable unit 23U (the intermediary transfer unit 20) is in the unlocked state (the first state).

On the other hand, as shown in part (b) of FIG. 18, in a state that the locking member 22 is disposed in the locked position (the second position), an abutting portion 223 provided with the locking member 22 abuts with an abutted portion 114 provided with the cleaning container 112 of the belt cleaning device 11. Thus, the locking member 22 interferes with a movement of the belt cleaning device 11 along a direction of the arrow K9 in the figure. Thus, in a state of part (b) of FIG. 18, the belt cleaning device 11 is configured so that the belt cleaning device 11 is not properly mounted on the intermediary transfer unit 20 by a gap L11, compared to a state of part (a) of FIG. 18. That is, when the locking member 22 is in the locked position (the second position), it prevents the belt cleaning device 11 from being mounted in the predetermined position during normal use. And, in this embodiment, when the intermediary transfer unit 20 is mounted on the main assembly 201 in the state shown in part (b) of FIG. 18, the intermediary transfer unit 20 protrudes to the right door RD side (a front side in a mounting direction) described above by the gap L11, and the right door RD is configured so that it is not closed. As a result, a prevention from forgetting to unlock the locking member 22 is attained.

7. Effect

As described above, in this embodiment, the belt feeding device 20 comprises the endless belt 7, a plurality of stretching rollers which are a plurality of stretching rollers that the belt 7 is stretched and include the tension roller 17 (which also serves as a steering roller in this embodiment), configured to stretch the belt, the bearing member 23 which rotatably supports the tension roller 17 in the end portion with respect to the direction of the rotational axis of the tension roller 17, a bearing support member 24 which movably supports the bearing member 23, the urging member 25 which is provided between the bearing member 23 and the bearing support member 24 and urges the tension roller 17 to apply tension to the belt 7, the supporting member 26 which supports the bearing support member 24, the locking member 22 which is capable of engaging with the bearing support member 24 and the bearing member 23 and is movable between the first position (the unlocked position) where one of engagements with the bearing support members 24 and the bearing member 23 is released and the urging member 25 is permitted to apply the tension to the belt 7 and the second position (the locked position) where the bearing support member 24 and the bearing member 23 are engaged and the tension of the urging member 25 applied to the belt 7 is released. And the bearing member 23, the bearing support member 24, the urging member 25, and the locking member 22 configure the dismountable unit 23U which is integrally dismountable from the supporting member 26 and the tension roller 17 in a state in which the locking member 22 is positioned in the second position. In this embodiment, the belt feeding device 20 includes a holding member 21 which swingably holds the supporting member 26, the bearing member 23 includes a sliding portion 231 capable of sliding the belt 7 during feeding of the belt 7 and configures a steering mechanism 17U capable of moving the belt 7 in a widthwise direction by swinging the tension roller 17 which is supported by the bearing member 23 by swinging the supporting member 26. In this embodiment, the sliding portion 231 includes a taper shaped surface having a lager outer diameter as tending to a downstream side from a central portion side toward an end portion side of the tension roller 17 with respect to the direction of the rotational axis of the tension roller 17.

In addition, in this embodiment, the bearing support member 24 is configured to be attached to the supporting member 26 by being moved along the direction of rotational axis of the tension roller 17, and the bearing member 23 is configured to be attached to the tension roller 17 by being moved along the direction of the rotational axis of the tension roller 17. And, in this embodiment, the belt feeding device 20 includes the restricting means 80 configured to restrict to move the bearing support member 24 along the direction of the rotational axis of the tension roller 17 in a state in which the locking member 22 is positioned in the first position and the belt 7 is stretched by a plurality of stretching roller, and to permit to move the bearing support member 24 along the direction of the rotational axis of the tension roller 17 in a state in which the locking member 22 is positioned in the second position. In this embodiment, the restricting means 80 includes a restricting portion 261 provided in the support member 26 and inclined to the direction of the rotational axis of the tension roller 17 so as to be positioned a downstream side in a urging direction to the bearing support member 24 by the urging member 25 as tending to a downstream side with respect to a moving direction of the bearing support member 24 when the bearing support member 24 is attached to the support member 26, and a restricting receive portion 242 provided in the bearing support member 24 and configured to engage with the restricting portion 261 by the bearing support member 24 being urged by the urging member 25 in a state in which the locking member 22 is positioned in the first position and the belt 7 is stretched by a plurality of tension rollers. In this embodiment, an inclined angle β of the restricting portion 261 relative to the direction of the rotational axis of the tension roller 17 is larger than a taper angle ψ of the taper shaped surface relative to the direction of the rotational axis of the tension roller 17.

In addition, in this embodiment, the locking member 22 is movably attached to the bearing member 24, when it is disposed at the first position, an engagement with the bearing member 23 is released, and when it is disposed at the second position, it engages with the bearing member 23. In embodiment, the bearing support member 24 includes the shaft portion 241, and the locking member 22 includes the hole portion 221, and the locking member 22 is attached to the bearing support member 24 so that it is rotatable around an axis line of the shaft portion 241 by rotatably fitting the shaft portion 241 into the hole portion 221. In this embodiment, the direction of the axis line of the shaft portion 241 is substantially parallel to the rotational axis direction of the tension roller 17. However, the present invention is not limited to such a configuration, the locking member 22 may be movably attached the bearing member 23 and may be configured so that when it is disposed at the first position, the engagement with the bearing support member 24 is released, and when it is disposed at the second position, it engages with the bearing support member 24. In addition, a rotational direction of the locking member 23 is not limited to a rotational direction around an axis line which is substantially parallel to the rotational axis line of the tension roller 17, but may be configured to rotate around an axis line along a direction which intersects (for example, substantially perpendicular to) the rotational axis line of the tension roller 17, for example. In addition, in this embodiment, the unit 23U is provided on both end portions of the tension roller 17 with respect to the direction of the rotational axis of the tension roller 17.

In addition, in this embodiment, the belt feeding device 20 includes another unit 11 configured to use to be dismountably mounted to a predetermined position of the belt feeding device 20 so as to oppose the tension roller 17 via the belt 7, when it is disposed at the first position, the locking member 22 permits the another unit 11 to be mounted on the predetermined position at the first position, and when it is disposed at the second position, it prevents the another unit 11 from being mounted on the predetermined position. In this embodiment, the another unit 11 includes a cleaning device configured to clean the belt 7.

Then, according to this embodiment, a tension applied to the intermediary transfer belt 7 by the tension spring 25 is released (blocked) only by substantially moving (rotating) the locking member 22 of the dismountable unit 23U. Then, the entire dismountable unit 23U, including the slide guide 24, the tension spring 25, the locking member 22, and the steering bearing 23, is integrally dismountable from the swingable plate 26 and steering roller 17. Thus, according to this embodiment, it is possible to easily mount on and dismount from the intermediary transfer belt 7 with a simple configuration. Improving an easiness of mounting and dismounting (an easiness of replacement) of the intermediary transfer belt 7 may also lead to prevent accidental damage to the intermediary transfer belt 7, etc., during replacement of the intermediary transfer belt 7, for example.

In particular, in a case that there is a part at an end portion of the stretching roller in the direction of the rotational axis which may interfere with mounting and dismounting of the belt, such as having a maximum outer diameter which is larger than an outer diameter of the stretching roller, it is desirable to remove the part when mounting and dismounting the belt. In a case that the dismountable unit 23 U is configured as including the bearing portion supporting such a stretching roller and further including the part, the dismountable unit 23U according to the present invention exhibits a particularly remarkable effect with respect to the easiness of mounting and dismounting of the belt. In this embodiment, the dismountable unit 23U is configured as including the steering bearing 23 (provided with the support portion **23*a* and the sliding surface 231), supporting the steering roller 17** which also serves as a tensioning roller, as such a stretching roller.

In addition, in this embodiment, the dismountable unit 23U, including the steering bearing 23 which configures the self-alignment mechanism 17U, is integrally dismountable as a whole. Thus, in this embodiment, it is not necessary to remove and disassemble parts one by one which are related to the steering bearing 23 and its supporting means and urging means, or to assemble and fix them one by one. As a result, according to this embodiment, it is possible not only to facilitate the replacement work of the intermediary transfer belt 7, but also to prevent an alignment performance from being affected due to reduction in positional accuracy of component parts.

In addition, in this embodiment, a position of the dismountable unit 23U with respect to the longitudinal direction of the swingable plate 26 is determined by the separation force and the prevention force described above while the tension is applied to the intermediary transfer belt 7 by the tension spring 25. As a result, in this embodiment, a positional accuracy of the dismountable unit 23U including the steering bearing 23 which configures the self-alignment mechanism 17U is improved, and it is possible to suppress the replacement work of the intermediary transfer belt 7 from affecting an alignment performance.

In this way, according to this embodiment, it is possible to replace the intermediary transfer belt 7 with a highly versatile and simple configuration, while it is possible to ensure an alignment performance and prevent an accidental damage, etc.

Embodiment 2

Next, the other embodiment of the present invention will be described. A basic configuration and operation of the image forming apparatus of this embodiment are the same as those of the image forming apparatus of Embodiment 1. Thus, in the image forming apparatus of this embodiment, elements having the same or corresponding functions or configurations as those of the image forming apparatus of Embodiment 1 are marked with the same codes and detailed description is omitted (the same applies to Embodiment 3 and Embodiment 4 described below).

Figure 19:
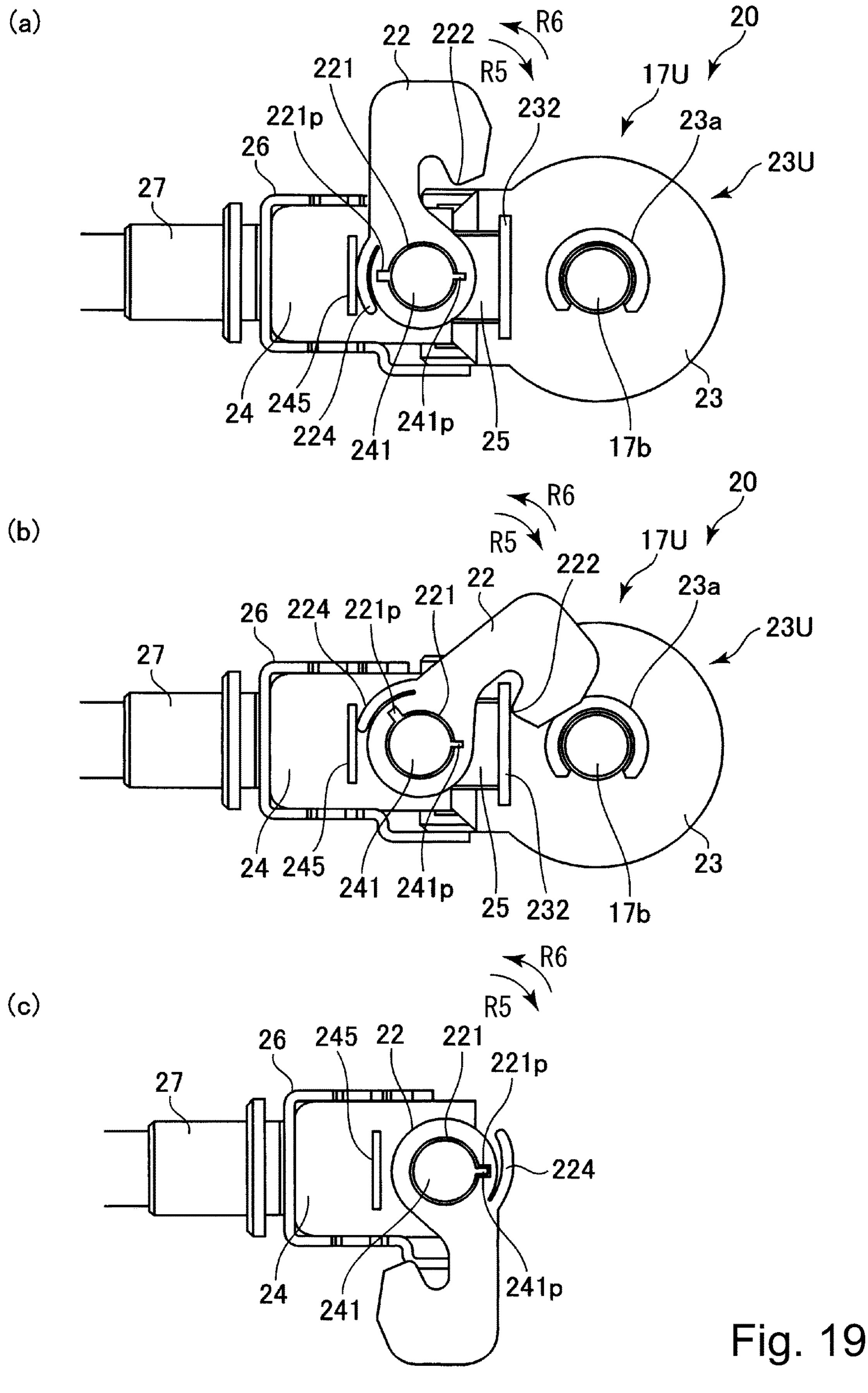
FIG. 19, part(a), part(b) and part(c), is a side view to illustrate another example of a locking member.

In this embodiment, a configuration provided in the slide guide 24 and the locking member 22 to prevent the locking member 22 from falling out of the slide guide 24. FIG. 19 is a side view showing a vicinity of the locking member 22 of the dismountable unit 23U in this embodiment. Part (a) of FIG. 19 shows a state that the locking member 22 which is attached to the slide guide 24 is disposed in the unlocked position (the first position) similar to part (a) of FIG. 14. In addition, part (b) of FIG. 19 shows a state that the locking member 22 attached to the slide guide 24 is disposed in the locked position (the second position) similar to part (b) of FIG. 14. In addition, part (c) of FIG. 19 shows a state that the locking member 22 is disposed in the dismountable position (the third position) when the locking member 22 is mounting on and dismounting from the slide guide 24.

In this embodiment, as shown in FIG. 19, parts (a) to (c), a retaining protrusion 241*p* is provided on the cylindrical shaft portion 241 as a locking member support portion of the slide guide 24. This retaining protrusion 241*p* is provided on a part of a circumferential direction in a vicinity of an end of the shaft portion 241, protruding in a radial direction of the shaft portion 241, that is, in a direction which intersects (in this embodiment, substantially perpendicular to) the direction of the axis line of the shaft portion 241. In addition, in this embodiment, as shown in FIG. 19, parts (a) to (c), a portion of an inner surface of the hole portion 221 as a support receive portion of the locking member 22 has a cutout groove portion 221*p* that the retaining protrusion 241*p* is capable of passing through when the locking member 22 is being attached to the slide guide 24.

When the locking member 22 is being attached to the slide guide 24, as shown in part (c) of FIG. 19, the locking member 22 is disposed in the dismountable position (the third position) where the retaining protrusion 241*p* passes through the cutout groove portion 221*p* with respect to the direction of rotation of the locking member 22. And the locking member 22 is attached to the slide guide 24 by moving it from outside to inside along the direction of the axis line of the shaft portion 241. After that, the locking member 22 is rotated in a direction of an arrow R6 in the figure, that is, in an opposite direction to a direction of rotation of the locking member 22 (the direction of the arrow K5 in the figure) from the unlocked position (the first position) to the locked position (the second position). As a result, with respect to the direction of rotation of the locking member 22, the cutout groove portion 221*p* is displaced from a position where it passes through the retaining protrusion 241*p*. In addition, it is possible for the retaining protrusion 241*p* to engage with an edge of the hole portion 221 other than the cutout groove portion 221*p*. Then, the retaining protrusion 241*p* engages with the locking member 22 to prevent the locking member 22 from falling off the slide guide 24. As shown in FIG. 19, parts (a) and (b), the retaining protrusion 241*p* and the cutout groove portion 221*p* are in different positions (phases) when the locking member 22 is in the unlocked position (the first position), the locked position (the second position), and positions between them with respect to the direction of rotation of the locking member 22. As a result, the retaining protrusion 241P is capable of restricting the locking member 22 from moving in a direction of pulling off from the slide guide 24 along the direction of axis line of the shaft portion 241 by engaging with the locking member 22.

In addition, in this embodiment, as shown in FIG. 19, parts (a) to (c), the slide guide 24 is provided with a rotation stopping portion 245 adjacent to the shaft portion 241 to restrict the rotation of the locking member 22. In addition, in this embodiment, as shown in FIG. 19, parts (a) to (c), the locking member 22 is provided with a rotation stop receiving portion 224 which is elastically deformable and adjacent to the hole portion 221. When the locking member 22 is rotated in the direction of the arrow K6 in the figure from the dismountable position (the third position) in part (c) of FIG. 19 to a vicinity of the locked position (the second position) in part (b) of FIG. 19, the rotation stop receiving portion 224 engages with the rotation stopping portion 245 while the rotation stop receiving portion 224 is elastically deformed. This engagement is maintained even in a state that the locking member 22 is disposed in the unlocked position (the first position) in part (a) of FIG. 19. The engagement between the rotation stopping portion 245 and the rotation stop receiving portion 224 is easily released by an elastic deformation of the rotation stop receiving portion 224 as an operator rotates the locking member 22. However, this engagement is not released by a self-weight of the locking member 22. Thus, after the locking member 22 is rotated so as to engage the rotation stopping portion 245 with the rotation stop receiving portion 224, the locking member 22 is prevented from being rotated accidentally to the dismountable position (the third position) where the cutout groove 221*p* is coincident with the retaining protrusion 241*p*. In addition, in this embodiment, this engagement of the rotation stopping portion 245 with the rotation stop receiving portion 224 also has a function of holding the locking member 22 in the unlocked position (the first position). As a result, the lock member 22 is prevented from being rotated accidentally when the intermediary transfer unit 20 is in use.

Embodiment 3

Figure 20:
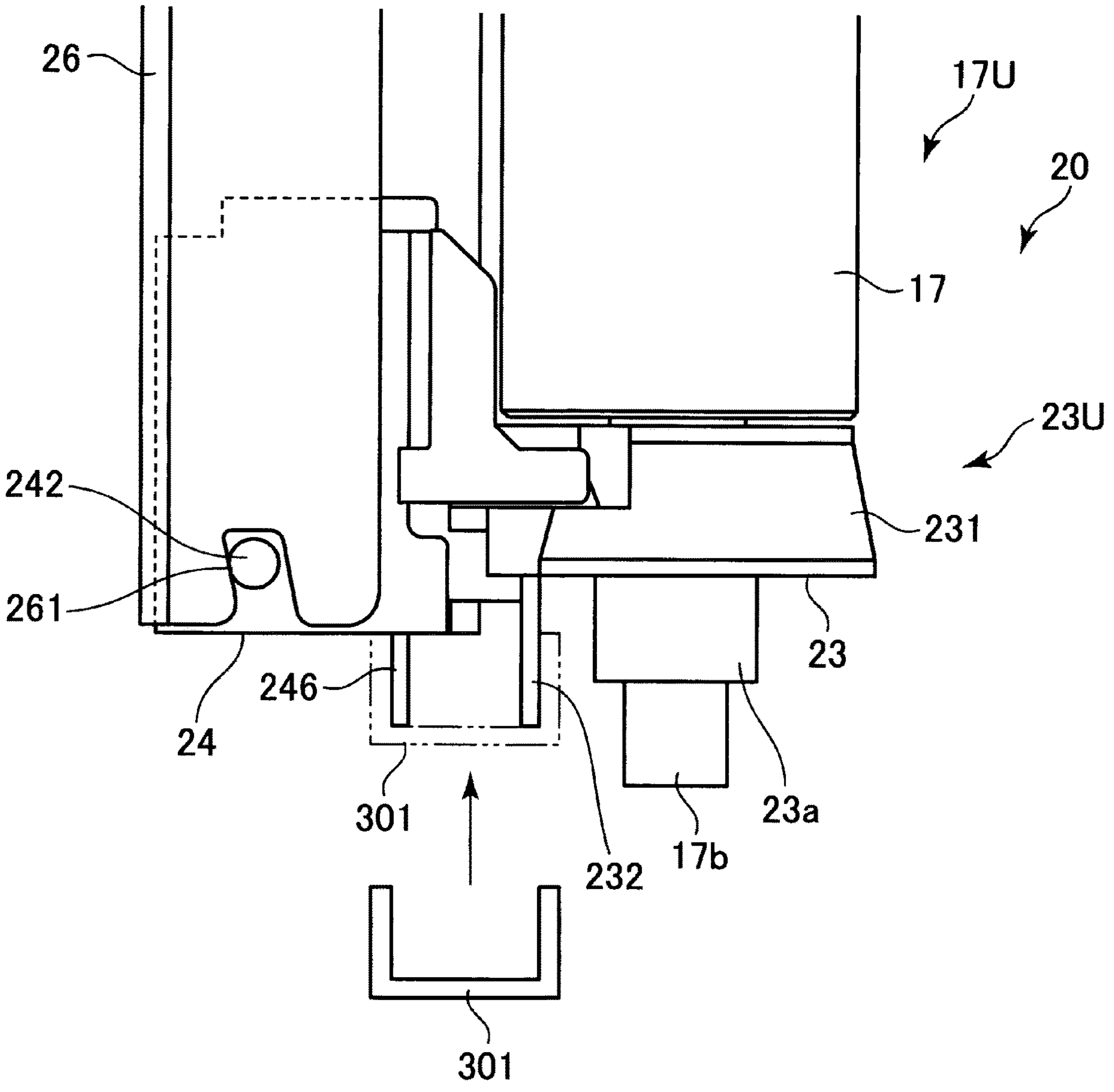
FIG. 20 is a schematic view to illustrate another example of a dismountable unit.

In this embodiment, a configuration, in which a member corresponding to the locking member 22 in Embodiment 1 (or Embodiment 2) is attached to the dismountable unit 23U only when the dismountable unit 23U is mounted or dismounted, will be described. FIG. 20 is a schematic view to illustrate the dismountable unit 23U in this embodiment.

In Embodiment 1 (Embodiment 2 is also same), the locking member 22 integrally configures the dismountable unit 23U together with the slide guide 24. As a result, it enables the dismountable unit 23U to be mounted and dismounted by substantially only moving (rotating) the locking member 22, thereby, it significantly improves the easiness of mounting and dismounting of the intermediary transfer belt 7, so it is preferable. However, it may be also configured that a member corresponding to the locking member 22 in Embodiment 1 is attached only when the dismountable unit 23U (the intermediary transfer unit 20) is locked (the second state).

That is, for example, as shown in FIG. 20, a first protrusion portion 246 as a first engagement portion corresponding to the shaft portion 241 in Embodiment 1 is provided with the slide guide 24. In addition, a second protrusion 232 similar to the protrusion 232 in Embodiment 1 as a second engagement portion is provided with the steering bearing 23. Then, instead of rotating the locking member 22 to engage the protrusion 232 in Embodiment 1, a locking tool 301 is engaged with the first protrusion 246 and the second protrusion 232 to block (release) an urging force (tension) against the intermediary transfer belt 7 by the tension spring 25. Incidentally, the locking tool 301 may have a similar configuration (shape) to the locking member 22 in Embodiment 1 (or Embodiment 2).

In this way, in this embodiment, the belt feeding device 20 includes the first engagement portion 246 provided on the bearing support member 24 and the second engagement portion 232 provided on the bearing member 23. The first engagement portion 246 and the second engagement portion 232 are configured to permit that a tension is applied to the belt 7 by the urging member 25, when the locking tool 301 which is possible to dismountably engage with the first engagement portion 246 and the second engagement portion 232, is not engaged with the first engagement portion 246 and the second engagement portion 232, and to release the tension applied to the belt 7 by the urging member 25 when the locking tool 301 is engaged with the first engagement portion 246 and the second engagement portion 232. And the bearing member 23, the bearing support member 24, and the urging member 25 configure a unit 23U which is integrally dismountable from the support member 26 and the tension roller 17 in a state that the locking tool 301 is engaged with the first engagement portion 246 and the second engagement portion 232.

This also allows to provide a corresponding effect to that described in Embodiment 1, although it has some limitations such as a need for an operator to bring the locking tool 301.

Embodiment 4

Figure 21:
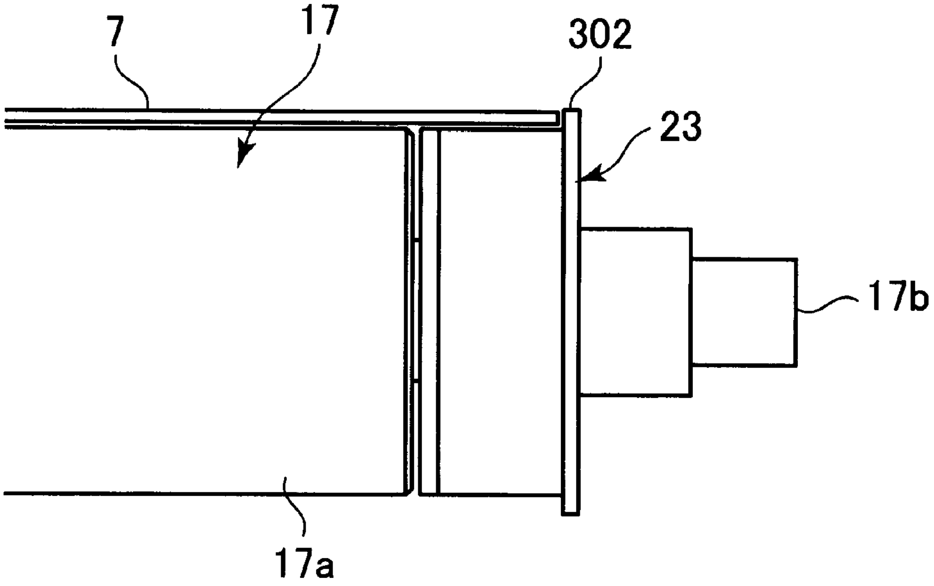
FIG. 21, part(a) and part(b), is a schematic view to illustrate another example of a dismountable unit.
Figure 21:
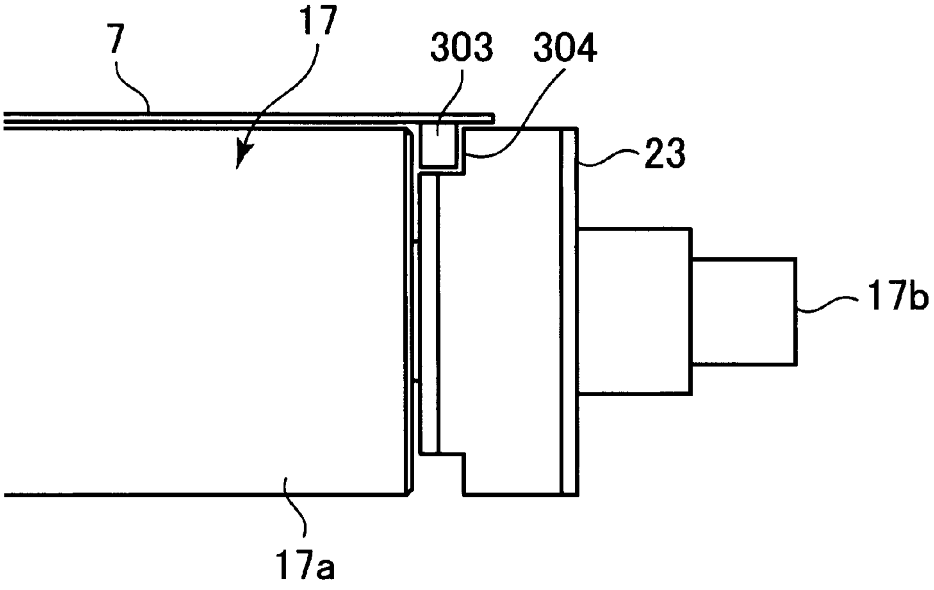

In this embodiment, the other example of the intermediary transfer unit 20 to which the dismountable unit 23U is applied will be described. FIG. 21 is a schematic view to illustrate the other example of the intermediary transfer unit 20 to which the dismountable unit 23U is applied.

As described above, an effect of applying the dismountable unit 23U according to the present invention is particularly significant in a case that there is a part at an end portion in a direction of a rotational axis line of the stretching roller which may interfere with mounting and dismounting of the belt, such as having a maximum outer diameter which is larger than an outer diameter of the stretching roller.

In Embodiment 1, the dismountable unit 23U includes the bearing member of the tension roller which also serves as a steering roller that configures the steering mechanism, and this bearing member is provided with the sliding portion which configures the steering mechanism. And this sliding portion includes a portion having an outer diameter which is larger than the outer diameter of the tension roller at an end portion in a direction of a rotational axis line of the tension roller. However, the present invention is not limited to this manner.

For example, the part which is provided at the end portion in the direction of the rotational axis of the stretching roller and may interfere with the mounting and dismounting of the intermediary transfer belt 7 as described above is not limited to the bearing member of the steering roller in Embodiment 1. For example, in order to suppress a movement (a meandering) of the intermediary transfer belt 7 in the width direction, it is considered that it may be configured as shown in part (a) of FIG. 21. That is, a belt restricting portion 302, which abuts with the end portion of the intermediary transfer belt 7 in the width direction and restricts the movement of the intermediary transfer belt 7 in the width direction by either integrating with the bearing member 23 of the tension roller 17 or disposing adjacent to the bearing member 23 as a separate member from the bearing member 23, is provided. The belt restricting portion 302 may be provided relatively rotatable to the bearing member 23. A maximum outer diameter of this belt restricting portion 302 may be larger than an outer diameter of the tension roller 17. Alternatively, it is considered that it may be configured as shown in part (b) of FIG. 21. That is, at the end portion of the intermediary transfer belt 7 in the width direction, a rib 303 extending along a peripheral direction of the intermediary transfer belt 7 is provided on a back side of the intermediary transfer belt 7. And the belt restricting portion 304, which engages the rib 303 and restricts the movement of the intermediary transfer belt 7 in the width direction by either integrating with the bearing member 23 of the tension roller 17 or disposing adjacent to the bearing member 23 as a separate member from the bearing member 23, is provided. The belt restricting portion 304 may be provided relatively rotatable to the bearing member 23. The maximum outer diameter of the belt restricting portion may not be larger than the outer diameter of the tension roller 17, however, it is desirable that this belt restricting portion 304 is dismountable in a case of mounting or dismounting of the intermediary transfer belt 7, since it interferes with the ribs 303 of the intermediary transfer belt 7.

In such a case, the dismountable unit 23 U may be configured to include at least the bearing member 23, the bearing support member 24 which supports the bearing member 23, the tension spring 25 which is disposed between the bearing member 23 and the bearing support member 24, and the locking member 22. As a result, it is possible to improve the easiness of mounting and dismounting of the intermediary transfer belt 7, as in a case of Embodiment 1. Incidentally, even in a case that the belt restricting portions 302 and 304 are separate members from the bearing member 23 as described above, the easiness of mounting and dismounting of the intermediary transfer belt 7 is correspondingly improved by applying the configuration of the dismountable unit 23U described above. The belt restricting portions 302 and 304, which are separate members from the bearing member 23, may also be integrally dismountable from the bearing member 23, etc. as the dismountable unit 23U.

Incidentally, the configurations of Embodiment 2 and Embodiment 3 may be combined with the configuration of this embodiment.

[Other]

As described above, the present invention is described in terms of specific embodiments, however, the present invention is not limited to the embodiments described above.

In the embodiments described above, the belt feeding device feeds the intermediary transfer belt, however, the present invention is not limited to this manner. For example, an image forming apparatus of a direct transfer system, which includes a recording material bearing belt configured with an endless belt as a recording material bearing member which bears and feeds a recording material on which a toner image formed on an image bearing member such as a photosensitive member is transferred, is well known to those who skilled in the art. The present invention may also be applied to a belt feeding device which feeds this recording material bearing belt. Besides, the present invention may be applied to a belt feeding device which feeds a photosensitive belt or an electrostatic recording dielectric belt as an image bearing member, or a belt, etc. as a heating rotating member or a pressure rotating member equipped with an image heating device such as a fixing device which heats a recording material. That is, a belt may be an image feeding member which bears and feeds a toner image directly or through a recording material. Typically, a belt is an intermediary transfer member which feeds a toner image primarily transferred from an image bearing member in order to secondarily transfer to a recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-155906 filed on Sep. 16, 2020, which is hereby incorporated by reference herein in its entirety.

What is claimed is:

1. An image forming apparatus comprising:

an image forming portion configured to form a toner image;

a belt unit provided with an endless belt to which the toner image formed by the image forming portion is transferred in a first transfer portion, the belt transferring the toner image transferred thereto from the belt to a recording material in a second transfer portion;

a fixing device disposed above the second transfer portion with respect to a vertical direction and configured to fix the toner image transferred to the recording material to the recording material; and an upper feeding path configured to feed the recording material upward from an accommodating portion for accommodating the recording material to the fixing device via the second transfer portion, wherein the belt unit comprises:

a plurality of stretching rollers, including a tension roller, configured to stretch the belt;

a first bearing member configured to rotatably support the tension roller in one end portion thereof with respect to a rotational axis direction of the tension roller;

a second bearing member configured to rotatably support the tension roller in the other end portion thereof with respect to the rotational axis direction;

a first bearing support member configured to movably support the first bearing member with respect to a direction crossing the rotational axis direction;

a second bearing support member configured to movably support the second bearing member with respect to a direction crossing the rotational axis direction;

a first urging member provided between the first bearing member and the first bearing support member and configured to urge the tension roller to apply tension to the belt;

a second urging member provided between the second bearing member and the second bearing support member and configured to urge the tension roller to apply tension to the belt;

a supporting member configured to support the first bearing support member and the second bearing support member;

a first locking member movably provided between a first locked position where the first bearing member is locked and a first unlocked position where the first bearing member is unlocked and capable of locking the first bearing member by engaging with the first bearing support member and the first bearing member; and a second locking member movably provided between a second locked position where the second bearing member is locked and a second unlocked position where the second bearing member is unlocked and capable of locking the second bearing member by engaging with the second bearing support member and the second bearing member;

wherein the first locking member is movably provided between the first locked position and the first unlocked position in a state in which the second locking member is positioned in the second locked position.

2. An image forming apparatus according to claim 1, wherein the first locking member includes a first hook portion configured to engage the first hook portion with one of the first bearing support member and the first bearing member when positioned in the first locked position, and to release an engagement between the first hook portion and one of the first bearing support member and the first bearing member when positioned in the first unlocked position.

3. An image forming apparatus according to claim 2, wherein the first bearing support member includes a swingable shaft configured to swingably support the first locking member, and wherein the first locking member includes a fitting portion configured to fit the swingable shaft and is swingably supported to the swingable shaft.

4. An image forming apparatus according to claim 3, wherein the swingable shaft is disposed on a side on which the first urging member is provided from a rotational axis of the first bearing member with respect to an urging direction of the first urging member.

5. An image forming apparatus according to claim 3, wherein the swingable shaft is disposed on a side on which the first urging member is provided from a rotational axis of the first bearing member with respect to a moving direction of the first bearing member.

6. An image forming apparatus according to claim 1, wherein the first locking member is configured to be movable between the first locked position and the first unlocked position by manual operation of an operator.

7. An image forming apparatus according to claim 1, wherein the first locking member is integrally provided with the first bearing member, the first bearing support member and the first urging member, and is dismountable from the belt unit.

8. An image forming apparatus according to claim 1, wherein the second transfer portion is disposed above the first transfer portion with respect to the vertical direction.

9. An image forming apparatus according to claim 1, wherein a bottom surface of the fixing device is disposed on a position higher than an upper surface of the belt with respect to the vertical direction.

* * * * *